United States Patent
Masuda et al.

(10) Patent No.: US 8,324,286 B2
(45) Date of Patent: Dec. 4, 2012

(54) HEAT-EXPANDABLE MICROSPHERES, METHOD FOR PRODUCING THE SAME, AND APPLICATION THEREOF

(75) Inventors: Toshiaki Masuda, Yao (JP); Ichiro Takahara, Yao (JP); Kenichi Kitano, Yao (JP); Katsushi Miki, Yao (JP); Takeshi Inohara, Yao (JP); Takeyoshi Fukuda, Yao (JP); Takayuki Aoki, Yao (JP); Satoshi Kawanami, Yao (JP)

(73) Assignee: Matsumoto Yushi-Seiyaku Co., Ltd., Yao-Shi (JP)

( * ) Notice: Subject to any disclaimer, the term of this patent is extended or adjusted under 35 U.S.C. 154(b) by 1275 days.

(21) Appl. No.: 12/089,600

(22) PCT Filed: Nov. 16, 2006

(86) PCT No.: PCT/JP2006/323384
§ 371 (c)(1),
(2), (4) Date: Apr. 8, 2008

(87) PCT Pub. No.: WO2007/058379
PCT Pub. Date: May 24, 2007

(65) Prior Publication Data
US 2009/0149559 A1    Jun. 11, 2009

(30) Foreign Application Priority Data

Nov. 21, 2005  (JP) ................................. 2005-365487
Sep. 14, 2006  (JP) ................................. 2006-281947

(51) Int. Cl.
*C08J 9/228* (2006.01)
*C08J 9/00* (2006.01)

(52) U.S. Cl. .......... 521/56; 521/189; 521/60; 428/402.2
(58) Field of Classification Search ............... 264/4–4.7; 427/213.3–213.36; 428/402–402.24
See application file for complete search history.

(56) References Cited

U.S. PATENT DOCUMENTS

| 3,615,972 | A | | 10/1971 | Morehouse et al. |
| 5,922,652 | A | * | 7/1999 | Kowalski et al. ............. 507/129 |
| 6,063,366 | A | * | 5/2000 | Sugai et al. ..................... 424/69 |

(Continued)

FOREIGN PATENT DOCUMENTS

JP  S62-286534 A  12/1987

(Continued)

OTHER PUBLICATIONS

Extended European Search Report of the corresponding European Application No. 06833188.3, dated Feb. 7, 2011.

*Primary Examiner* — James J Seidleck
*Assistant Examiner* — S. Camilla Pourbohloul
(74) *Attorney, Agent, or Firm* — Global IP Counselors, LLP

(57) ABSTRACT

Heat-expandable microspheres include a shell of thermoplastic resin and a blowing agent encapsulated therein having a boiling point not higher than the softening point of the thermoplastic resin, have a maximum expanding ratio not lower than 50 times, and are thermally expanded into hollow particulates having a repeated-compression durability not lower than 75 percent. The method of producing the heat-expandable microspheres includes the steps of dispersing an oily mixture containing a polymerizable component and the blowing agent in an aqueous dispersing medium containing a specific water-soluble compound and polymerizing the polymerizable component contained in the oily mixture.

5 Claims, 1 Drawing Sheet

U.S. PATENT DOCUMENTS

| | | | |
|---|---|---|---|
| 6,365,641 | B1 | 4/2002 | Masuda et al. |
| 6,613,810 | B1 | 9/2003 | Ejiri et al. |
| 2007/0154711 | A1 | 7/2007 | Masuda et al. |

FOREIGN PATENT DOCUMENTS

| | | | |
|---|---|---|---|
| JP | H11-209504 A | | 8/1999 |
| JP | 2003-001098 A | | 1/2003 |
| JP | 2003-327482 A | | 11/2003 |
| JP | 2003-327483 A | | 11/2003 |
| JP | 2004-18584 A | | 1/2004 |
| JP | 2004-131361 A | | 4/2004 |
| JP | 2005-67943 A | | 3/2005 |
| JP | 2006-2134 A | | 1/2006 |
| JP | 2006-213930 A | | 8/2006 |
| WO | WO-99/37706 A1 | | 7/1999 |
| WO | WO-01/23081 A1 | | 4/2001 |
| WO | WO-2005/049698 A1 | | 6/2005 |

\* cited by examiner

HEAT-EXPANDABLE MICROSPHERES, METHOD FOR PRODUCING THE SAME, AND APPLICATION THEREOF

CROSS-REFERENCE TO RELATED APPICATIONS

This U.S. National stage application claims priority under 35 U.S.C. §119(a) to PCT Patent Application PCR/JP2006/323384 filed Nov. 16, 2006 and to Japanese Patent Application Nos. 2005-365487, filed in Japan on Nov. 21, 2005, and 2006-281947, filed in Japan on Sep. 14, 2006, the entire contents of which are hereby incorporated herein by reference.

TECHNICAL FIELD

The present invention relates to heat-expandable microspheres, a method producing the same, and application thereof.

TECHNICAL BACKGROUND

Heat-expandable microspheres which have a structure comprising a shell of thermoplastic resin and a blowing agent encapsulated therein are generally called heat-expandable microcapsules. Thermoplastic resins used to make heat expandable microspherers include vinylidene chloride copolymers, acrylonitrile copolymers, and acrylic copolymers; and a blowing agent mainly employed includes hydrocarbons, such as isobutane and isopentane. (Refer to Patent Reference 1.)

Heat-expandable microcapsules having high thermal durability, for example, those comprising a shell of thermoplastic resin produced from a component containing 80 weight percent or more of a nitrile monomer, 20 weight percent or less of a non-nitrile monomer, and a cross-linking agent are disclosed in Patent Reference 2. The method produces heat-expandable microcapsules in a process where a polymerizable mixture comprising a blowing agent, a polymerizable monomer and a polymerization initiator is suspension-polymerized in an aqueous dispersing medium comprising colloidal silica as a dispersion stabilizer (a suspending agent), a diethanol amine-adipic acid condensate as a stabilizing auxiliary, and a polymerization auxiliary.

The polymerization auxiliary is usually used to control the generation of emulsion-polymerization products or prevent the generation of scale in an aqueous medium in the process of suspension-polymerization. Recently, a demand for developing a polymerization auxiliary, which improves the properties of resultant heat-expandable microcapsules and hollow particulates produced by thermally expanding the microcapsules, has been emerged, aside from the purpose for controlling the generation of emulsion-polymerization products and preventing scale in an aqueous medium. Patent Reference 3 discloses a method of producing heat-expandable microcapsules by applying a so-called polymerization inhibitor, such as ascorbic acids and alkali metal nitrites, instead of potassium dichromate. Patent Reference 3 describes that the heat-expandable microcapsules produced in the method sharply expand in heating and are processed into uniformly expanded product (hollow particulates). However, the properties, such as expanding ratio, of the microcapsules are not sufficiently improved. Furthermore ascorbic acids are not preferable because they have poor thermal stability and decompose to lose their function as a polymerization inhibitor during polymerization reaction. In addition, alkali metal nitrites cause a problem, a cost for wastewater treatment after polymerization, because the Ordinance for Water Pollution Control Law which enforces the Water Pollution Control Law of Japan defines the limit values of alkali metal nitrites contained in ground water. Thus ascorbic acids and alkali metal nitrites are not satisfactory as polymerization auxiliaries at present, because they do not sufficiently improve the properties of resultant heat-expandable microcapsules and hollow particulates obtained by thermally expanding the microcapsules, and they cause the problem mentioned above when they are employed in polymerization.

In the conventional research and development for hollow particulates obtained by thermally expanding heat-expandable microcapsules, the variants and ratio of thermoplastic resin and a blowing agent constituting hollow particulates have mainly been studied to improve the properties of the hollow particulates.

Hollow particulates having improved repeated-compression durability are described, for example, in Patent References 4 and 5, where heat-expanded microcapsules having polar groups on their surface are disclosed as hollow particulates which are durable against rupture in mixing and molding a ceramic composition. However, the durability of the microcapsules against rupture in mixing and molding is not sufficiently improved.

Patent Reference 6 describes hollow particulates for lightweight cement articles. The hollow particulates are produced by thermally expanding heat-expandable microcapsules which comprise a shell of polymer obtained from a certain monomer composition and a cross-linking agent, and have an expanding ratio ranging from 20 times to 100 times. However, the durability of the hollow particulates is not sufficiently improved.

Further, Patent Reference 7 discloses a mixture of hollow particulates and heat-expandable microcapsules which are durable against rupture in mixing and molding a ceramic composition. However, the invention has only sharpened the particle size distribution of the mixture, and has not substantially improved the durability.

As mentioned above, hollow particulates having sufficiently improved durability against repeated compression have not been produced, though the durability of hollow particulates against repeated compression has been examined in various ways. The hollow particulates obtained by thermally expanding the heat-expandable microcapsules described in the Patent Reference 3 have also poor durability against repeated compression.

[Patent Reference 1] U.S. Pat. No. 3,615,972
[Patent Reference 2] JP A 62-286534
[Patent Reference 3] JP A 11-209504
[Patent Reference 4] JP A 2003-327482
[Patent Reference 5] JP A 2003-327483
[Patent Reference 6] JP A 2004-131361
[Patent Reference 7] JP A 2005-067943

SUMMARY OF THE INVENTION

Technical Problem

The object of the present invention is to provide heat-expandable microspheres, which have high expanding ratio and become hollow particulates exhibiting excellent resistance against repeated compression after thermal expansion; a method for producing the same; and application thereof.

Technical Solution

For solving the problems described above, the inventors of the present invention have studied diligently to find that 1) heat-expandable microspheres having certain properties solve the above mentioned problems, and 2) the heat-expandable microspheres are produced by dispersing an oily mixture containing a polymerizable component and a blowing agent in an aqueous dispersing medium containing a certain water-soluble compound and polymerizing the component in the mixture; and have achieved the present invention.

The heat-expandable microspheres of the present invention comprise a shell of thermoplastic resin and a blowing agent encapsulated therein having a boiling point not higher than the softening point of the thermoplastic resin, and have a maximum expanding ratio not lower than 50 times; and the hollow particulates produced by thermally expanding the microspheres have a repeated-compression durability not lower than 75 percent.

The method of producing heat-expandable microspheres of the present invention produces heat-expandable microspheres which comprise a shell of thermoplastic resin and a blowing agent encapsulated therein having a boiling point not higher than the softening point of the thermoplastic resin; and the method comprises the steps of dispersing an oily mixture containing a polymerizable component and a blowing agent in an aqueous dispersing medium containing at least one water-soluble compound; and polymerizing the polymerizable component in the oily mixture; wherein the water-soluble compound is selected from water-soluble 1,1-substituted compounds having a structure in which a hetero atom and a hydrophilic functional group selected from the group consisting of water-soluble metal salts and/or their hydrates, water-soluble polyphenols, water-soluble vitamin Bs, hydroxyl group, carboxylic acid (salt) groups, and phosphonic acid (salt) groups are bonded to the same carbon atom.

Another method of producing heat-expandable microspheres of the present invention produces heat-expandable microspheres which comprise a shell of thermoplastic resin and a blowing agent encapsulated therein having a boiling point not higher than the softening point of the thermoplastic resin; and the method comprises the steps of dispersing the oily mixture containing a polymerizable component and a blowing agent in an aqueous dispersing medium containing 0.001 ppm or more of halide ion and 0.001 to 100 ppm of an ion of at least one metal selected from the group consisting of scandium, cerium, titanium, zirconium, hafnium, vanadium, tantalum, chrome, molybdenum, tungsten, manganese, rhenium, iron, ruthenium, osmium, cobalt, rhodium, nickel, silver, gold, zinc, cadmium, boron, aluminum, gallium, indium, thallium, tin, lead, arsenic, antimony, and bismuth, and polymerizing the polymerizable component in the oily mixture.

The hollow particulates of the present invention are produced by heating and expanding the above-mentioned heat-expandable microspheres and/or the heat-expandable microspheres produced in the above mentioned methods of producing heat-expandable microspheres.

The composition of the present invention comprises a base component and the above-mentioned heat-expandable microspheres and/or the above-mentioned hollow particulates.

The formed products of the present invention are produced by forming the above-mentioned composition.

Advantageous Effects

The heat-expandable microspheres of the present invention have high expanding ratio, and are thermally expanded into hollow particulates having excellent durability against repeated compression.

The method of producing the heat-expandable microspheres of the present invention efficiently produces heat-expandable microspheres, which have high expanding ratio, and are thermally expanded into hollow particulates having excellent durability against repeated compression.

The hollow particulates of the present invention have excellent durability against repeated compression, because they are produced from the heat-expandable microspheres.

The composition and the formed products of the present invention comprise the hollow particulates and have excellent durability against repeated compression.

EXPLANATION OF REFERENCES

Figure 1:
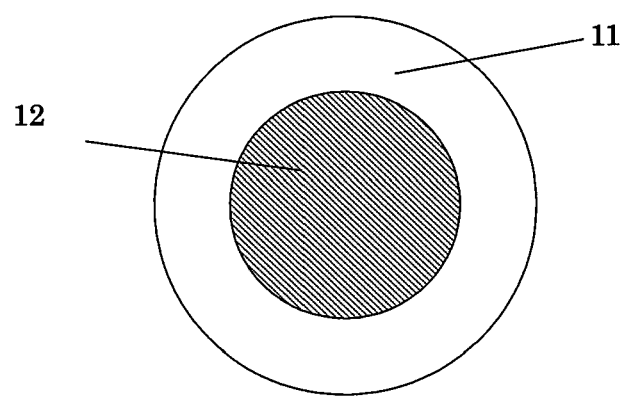
[FIG. 1] Diagram illustrating an example of heat-expandable microspheres of the present invention
Figure 2:
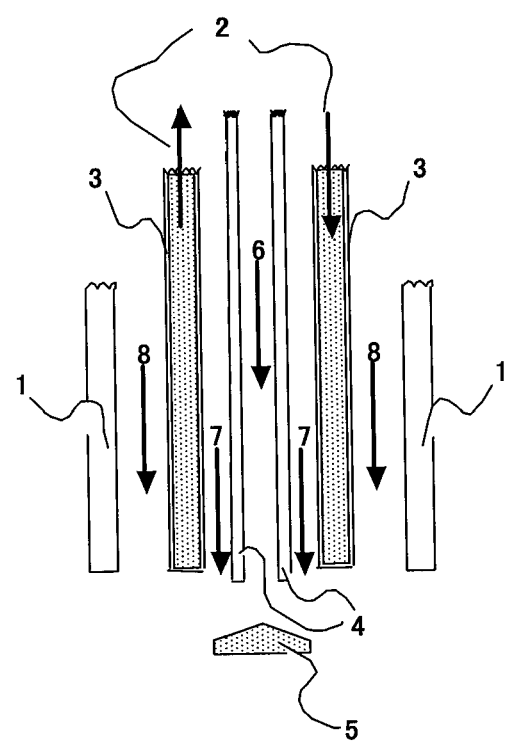
[FIG. 2] Diagram illustrating the expanding device of the manufacturing equipment employed in a production process of hollow particulates for measuring their repeated-compression durability

1: Hot gas nozzle
2: Cooling medium flow
3: Overheating preventive tube
4: Dispersion nozzle
5: Collision plate
6: Gas fluid containing heat-expandable microspheres
7: Gas flow
8: Hot gas flow
11: Shell of thermoplastic resin
12: Blowing agent

DETAILED DESCRIPTION OF THE INVENTION

The present invention is described in detail as in the following.

[Production Method of Heat-Expandable Microspheres]

The method of producing heat-expandable microspheres of the present invention produces heat-expandable microspheres which comprise a shell of thermoplastic resin and a blowing agent encapsulated therein having a boiling point not higher than the softening point of the thermoplastic resin. The method of the present invention comprises the steps of dispersing an oily mixture containing a polymerizable component and the blowing agent in an aqueous dispersing medium containing a certain water-soluble compound, and polymerizing the polymerizable component contained in the oily mixture.

The blowing agent is not specifically restricted so far as it is a substance having a boiling point not higher than the softening point of the thermoplastic resin, and includes, for example, $C_{1-12}$ hydrocarbons and their halides, $C_{2-10}$ fluorides having an ether structure and containing no chlorine and bromine atoms, tetraalkyl silane, and compounds which thermally decompose to generate gas. One of or at least two of those blowing agents may be used.

The examples of the $C_{1-12}$ hydrocarbons are propane, cyclopropane, propylene, butane, normal butane, isobutane, cyclobutane, normal pentane, cyclopentane, isopentane, neopentane, normal hexane, isohexane, cyclohexane, heptane, cycloheptane, octane, isooctane, cyclooctane, 2-methyl pentane, 2,2-dimethyl butane, and petroleum ether. Any of these hydrocarbons having a linear, branched or alicyclic structure is applicable, and aliphatic hydrocarbons are preferable.

The halides of $C_{1-12}$ hydrocarbons include methyl chloride, methylene chloride, chloroform, and carbon tetrachloride.

The $C_{2-10}$ fluorides having an ether structure and containing no chlorine and bromine atoms include, for example, hydrofluoroethers, such as $C_3H_2F_7OCF_2H$, $C_3HF_6OCH_3$, $C_2HF_4OC_2H_2F_3$, $C_2H_2F_3OC_2H_2F_3$, $C_4HF_8OCH_3$, $C_3H_2F_5OC_2H_3F_2$, $C_3HF_6OC_2H_2F_3$, $C_3H_3F_4OCHF_2$, $C_3HF_6OC_3H_2F_5$, $C_4H_3F_6OCHF_2$, $C_3H_3F_4OC_2HF_4$, $C_3HF_6OC_3H_3F_4$, $C_3F_7OCH_3$, $C_4F_9OCH_3$, $C_4F_9OC_2H_5$, and $C_7F_{15}OC_2H_5$. One of or at least two of those fluorides may be used. The (fluoro)alkyl groups of those hydrofluoroethers may be either linear or branched groups.

The tetraalkyl silane includes, for example, silanes having $C_{1-5}$ alkyl groups, such as tetramethyl silane, trimethylethyl silane, trimethylisopropyl silane, and trimethyl-n-propyl silane.

The compounds which thermally decompose to generate gas include, for example, azodicarbonamide, N,N'-dinitropentamethylene tetramine, and 4,4'-oxybis (benzenesulfonyl hydrazide).

The polymerizable component is polymerized in the presence of a polymerization initiator to be converted into thermoplastic resin which constitutes the shell of heat-expandable microspheres. The polymerizable component essentially comprises a monomer component and optionally contains a cross-linking agent.

The monomer component includes those usually called (radically) polymerizable monomers having one polymerizable double bond, and includes, but not specifically restricted, for example, nitrile monomers such as acrylonitrile, methacrylonitrile, alpha-chloroacrylonitrile, alpha-ethoxyacrylonitrile, and fumaronitrile; monomers having a carboxyl group, such as acrylic acid, methacrylic acid, itaconic acid, maleic acid, fumaric acid, and citraconic acid; halogenated vinyl monomers such as vinyl chloride, vinylidene chloride, vinyl bromide, and vinyl fluoride; vinylester monomers such as vinyl acetate, vinyl propionate, and vinyl butyrate; (meth)acrylate monomers, such as methyl (meth)acrylate, ethyl (meth)acrylate, n-butyl (meth)acrylate, isobutyl (meth)acrylate, t-butyl (meth)acrylate, propyl (meth)acrylate, n-octyl (meth)acrylate, dodecyl (meth)acrylate, 2-ethylhexyl (meth)acrylate, stearyl (meth)acrylate, 2-chloroethyl (meth)acrylate, phenyl (meth)acrylate, isobornyl (meth)acrylate, cyclohexyl (meth)acrylate, benzyl (meth)acrylate, beta-carboxyethyl acrylate, 2-hydroxyethyl (meth)acrylate, and 2-hydroxypropyl (meth)acrylate; styrene monomers, such as styrene, alpha methyl styrene, and chlorostyrene; acrylamide monomers, such as acrylamide, substituted acrylamide, methacrylamide, and substituted methacrylamide; maleimide monomers, such as N-phenyl maleimide, N-(2-chlorophenyl) maleimide, N-cyclohexyl maleimide, and N-lauryl maleimide; styrene monomers, such as styrene, o-methyl styrene, m-methyl styrene, p-methyl styrene, p-ethyl styrene, 2,4-dimethyl styrene, p-n-butyl styrene, p-tert-butyl styrene, p-n-hexyl styrene, p-n-octyl styrene, p-n-nonyl styrene, p-n-decyl styrene, p-n-dodecyl styrene, n-methoxystyrene, p-phenyl styrene, p-chlorostyrene, and 3,4-dichlorostyrene; ethylenically unsaturated monoolefin monomers, such as ethylene, propylene, butylene, and isobutylene; vinyl ether monomers, such as vinyl methyl ether, vinyl ethyl ether, and vinyl isobutyl ether; vinyl ketone monomers, such as vinyl methyl ketone, vinyl hexyl ketone, and methyl isopropenyl ketone; N-vinyl monomers such as N-vinyl pyrrole, N-vinyl carbazole, N-vinyl indole, and N-vinyl pyrolidone; and vinylnaphthalene salts. Part of or all of the carboxyl groups in the monomers having a carboxyl group may be neutralized in polymerization. The term, (meth)acryl, means acryl or methacryl. The maleimide monomers should preferably be an N-substituted maleimide having a substituent group bonded to its nitrogen atom.

One of or at least two of those radically polymerizable monomers may be used. A polymerizable component should preferably contain at least one radically polymerizable monomer selected from the group consisting of nitrile monomers, (meth)acrylate monomers, monomers having a carboxyl group, styrene monomers, vinyl acetate, acrylamide monomers, maleimide monomers, and halogenated vinyl monomers.

A polymerizable component essentially comprising nitrile monomers is preferable because such component attains improved heat resistance and solvent resistance of thermoplastic resin constituting the shell of heat-expandable microspheres.

A polymerizable component comprising a halogenated vinyl monomer and/or (meth)acrylate monomer in addition to nitrile monomers is further preferable. A polymerizable component containing a halogenated vinyl monomer, such as vinylidene chloride, improves gas-barrier property of heat-expandable microspheres. A polymerizable component containing a (meth)acrylate monomer contributes to easy control of expanding behavior of heat-expandable microspheres.

The polymerizable component further comprises a monomer containing a carboxyl group in addition to a nitrile monomer is preferable, because such component improves the heat resistance and solvent resistance of the thermoplastic resin, increases the glass-transition temperature of the thermoplastic resin, and enables heat-expandable microspheres to expand at high temperature. The polymerizable component may further contain a halogenated vinyl monomer and/or (meth)acrylate monomer in addition to the nitrile monomer and monomer containing a carboxyl group.

In the above description, a polymerizable component which further contains a maleimide monomer is preferable because such component minimizes the coloring of heat-expandable microspheres.

The ratio of each radically polymerizable monomer constituting a polymerizable component is not specifically restricted, and the weight ratios described in the following (A) to (F) are preferable.

(A) Polymerizable Component Essentially Comprising a Halogenated Vinyl Monomer

The weight ratio of a halogenated vinyl monomer to a polymerizable component should preferably be not lower than 10 weight percent, more preferably not lower than 20 weight percent, further more preferably not lower than 30 weight percent, and most preferably not lower than 40 weight percent.

(B) Polymerizable Component Essentially Comprising a Nitrile Monomer and (meth)acrylate Monomer in Addition to a Halogenated Vinyl Monomer.

The weight ratio of a halogenated vinyl monomer to a polymerizable component should preferably range from 90 to 10 weight percent, more preferably from 85 to 15 weight percent, further preferably from 80 to 20 weight percent, further more preferably from 75 to 25 weight percent, and most preferably from 70 to 40 weight percent. The weight ratio of a nitrile monomer to a polymerizable component should preferably range from 10 to 90 weight percent, more preferably from 15 to 85 weight percent, further preferably from 20 to 80 weight percent, further more preferably from 25 to 70 weight percent, and most preferably from 30 to 60 weight percent. The weight ratio of a (meth)acrylate monomer to a polymerizable component should preferably range from 1 to 20 weight percent, more preferably from 3 to 18 weight percent, and most preferably range from 5 to 15 weight percent.

(C) Polymerizable Component Essentially Comprising a (meth)acrylate Monomer in Addition to a Nitrile Monomer The weight ratio of a nitrile monomer to a polymerizable component should preferably range from 30 to 99 weight percent, more preferably from 35 to 99 weight percent, further preferably from 40 to 99 weight percent, further more preferably from 45 to 99 weight percent, and most preferably from 50 to 99 weight percent. The weight ratio of a (meth) acrylate monomer to a polymerizable component should preferably range from 70 to 1 weight percent, more preferably from 65 to 1 weight percent, further preferably from 60 to 1 weight percent, further more preferably from 55 to 1 weight percent, and most preferably range 50 to 1 weight percent.

(D) Polymerizable Component Essentially Comprising a Maleimide Monomer

The weight ratio of a maleimide monomer to a polymerizable component should preferably range from 0.1 to 60 weight percent, more preferably from 0.3 to 55 weight percent, further more preferably from 0.5 to 50 weight percent, and most preferably from 1 to 50 weight percent.

(E) Polymerizable Component Essentially Comprising a Monomer Containing a Carboxyl Group The weight ratio of a monomer containing a carboxyl group to a polymerizable component should preferably be not lower than 5 weight percent, more preferably not lower than 10 weight percent, further more preferably not lower than 15 weight percent, and most preferably not lower than 20 weight percent.

(F) Polymerizable Component Essentially Comprising a Monomer Containing a Carboxyl Group in Addition to a Nitrile Monomer The weight ratio of a nitrile monomer to a polymerizable component should preferably range from 20 to 95 weight percent, more preferably from 20 to 90 weight percent, further preferably from 20 to 85 weight percent, further more preferably from 20 to 80 weight percent, and most preferably from 20 to 60 weight percent. The weight ratio of a monomer containing a carboxyl group to a polymerizable component should preferably range from 5 to 80 weight percent, more preferably from 10 to 80 weight percent, further preferably from 15 to 80 weight percent, further more preferably from 20 to 80 weight percent, and most preferably from 40 to 80 weight percent.

In the case that a monomer component essentially comprises a monomer component containing a carboxyl group (in other words, in the case of (E) and (F) mentioned above), the monomer component may contain a monomer which is reactive with the carboxyl monomer in the monomer containing a carboxyl group, as a monomer other than the monomer containing a carboxyl group. The monomer component comprises a monomer containing a carboxyl group and a monomer reactive with the carboxyl group in the monomer containing a carboxyl group further improves heat resistance of heat-expandable microspheres so as to improve the expanding performance of heat-expandable microspheres at high temperature.

Such monomers reactive with a carboxyl group in a monomer containing a carboxyl group include, for example, N-methylol (meth)acrylamide, N,N-dimethyl aminoethyl (meth) acrylate, N,N-dimethyl aminopropyl (meth)acrylate, magnesium mono(meth)acrylate, zinc mono(meth)acrylate, vinyl glycidyl ether, propenyl glycidyl ether, glycidyl (meth) acrylate, 2-hydroxyethyl (meth)acrylate, 2-hydroxypropyl (meth)acrylate, 2-hydroxybutyl (meth)acrylate, and 2-hydroxy-3-phenoxypropyl (meth)acrylate. The weight ratio of the monomers reactive with a carboxyl group in a monomer having a carboxyl group to a monomer component should preferably range from 0.1 to 10 weight percent, more preferably from 1 to 8 weight percent, and most preferably from 3 to 5 weight percent.

The monomer component comprises a monomer having a halogen, oxygen, or nitrogen atom effectively prevents aggregated heat-expandable microspheres generated in polymerization and scale generated in a polymerization reactor.

The polymerizable component may contain a polymerizable monomer having at least two polymerizable double bonds (a cross-linking agent), in addition to the monomer components mentioned above. Polymerization with a cross-linking agent controls the loss of the retention of a blowing agent encapsulated in thermally expanded microspheres (internal retention) so as to thermally expand the microspheres efficiently.

The cross-linking agent is not specifically restricted, and it includes aromatic divinyl compounds, such as divinyl benzene and divinyl naphthalene; and di(meth)acrylate compounds, such as allyl methacrylate, triacrylformal, triallyl isocyanate, ethylene glycol di(meth)acrylate, diethylene glycol di(meth)acrylate, triethylene glycol di(meth)acrylate, 1,4-butanediol di(meth)acrylate, 1,9-nonanediol di(meth) acrylate, 1,10-decanediol di(meth)acrylate, PEG (200) di(meth)acrylate, PEG (400) di(meth)acrylate, PEG (600) di(meth)acrylate, neopentylglycol di(meth)acrylate, 1,4-butanediol dimethacrylate, 1,6-hexanediol di(meth)acrylate, 1,9-nonanediol di(meth)acrylate, trimethylolpropane trimethacrylate, glycerin dimethacrylate, dimethylol tricyclodecane diacrylate, pentaerythritol tri(meth)acrylate, pentaerythritol tetraacrylate, dipentaerythritol hexaacrylate, neopentylglycol acrylic acid benzoate, trimethylolpropane acrylic acid benzoate, 2-hydrorxy-3-acryloyloxypropyl methacrylate, hydroxypivalic acid neopentylglycol diacrylate, ditrimethylolpropane tetraacrylate, and 2-butyl-2-ethyl-1,3-propanediol diacrylate. One of or at least two of those cross-linking agents may be used. In the above description, the series of the compounds described as "PEG (***) dimethacrylate" are polyethylene glycol di(meth)acrylates, wherein the average molecular weight of their polyethylene glycol moieties is represented by the number in the parentheses.

The amount of the cross-linking agent is not specifically restricted, and it should preferably be in the ranges described below from 1) to 7) in the order (a latter range is more preferable than a former) to 100 parts by weight of a monomer component, considering the degree of cross-linking, the internal retention of a blowing agent encapsulated in a shell, and heat resistance and thermal expanding performance of microspheres.

The ranges are 1) 0.01 to 5 parts by weight, 2) 0.03 to 3 parts by weight, 3) 0.05 to 3 parts by weight, 4) 0.05 to 2.5 parts by weight, 5) 0.1 to 2.5 parts by weight, 6) 0.1 to 2 parts by weight, and 7) 0.3 to 2 parts by weight.

In the production method of the present invention, it is preferable to employ an oily mixture containing a polymerization initiator to polymerize the polymerizable component in the presence of the polymerization initiator.

The polymerization initiator is not specifically restricted, and includes, for example, peroxides, such as peroxydicarbonate, peroxy ester, and diacyl peroxide; and azo compounds. One of or at least two of the polymerization initiator may be employed. A preferable polymerization initiator is an oil-soluble polymerization initiator which is soluble in a radically polymerizable monomer.

The peroxydicarbonate includes, for example, diethyl peroxydicarbonate, di(n-propyl) peroxydicarbonate, diisopropyl peroxydicarbonate, bis(4-t-butylcyclohexyl) peroxydicarbonate, di(2-ethoxyethyl) peroxydicarbonate, di(3-methoxybutyl) peroxydicarbonate, di(sec-butyl) peroxydicarbonate, di(2-ethylhexyl) peroxydicarbonate, di(2-octyl) peroxydicarbonate, dicyclohexyl peroxydicarbonate, and dibenzyl peroxydicarbonate.

The peroxy ester includes, for example, t-butyl peroxyisobutylate, t-butyl peroxy-2-ethylhexanoate, t-hexyl peroxy-2-ethylhexanoate, 2,5-dimethyl-2,5-bis(2-ethylhexanoyl peroxy) hexane, 1,1,3,3-tetramethylbutyl peroxy-2-ethylhexanoate, t-butyl peroxypivalate, t-hexyl peroxypivalate, t-butyl peroxyneodecanoate, t-hexyl peroxyneodecanoate, 1-cyclohexyl-1-methylethyl peroxyneodecanoate, 1,1,3,3-tetramethylbutyl peroxyneodecanoate, cumyl peroxyneodecanoate, and t-butyl peroxy-3,5,5-trimethylhexanoate.

The diacyl peroxide includes, for example, peroxides such as octanoyl peroxide, lauroyl peroxide, stearyl peroxide, succinic acid peroxide, and benzoyl peroxide; and azo compounds, such as 2,2'-azobis (4-methoxy-2,4-dimethyl valeronitrile), 2,2'-azobis isobutyronitrile, 2,2'-azobis (2,4-dimethyl valeronitrile), 2,2'-azobis (2-methyl propionate), and 2,2'-azobis (2-methyl butyronitrile).

Among those polymerization initiators, peroxydicarbonates are preferable because they control the generation of resin particles inside the shell of heat-expandable microspheres, make the shell less apt to become thinner than its theoretical value, and increase the expanding ratio of resultant heat-expandable microspheres. At least one selected from the group consisting of diisopropyl peroxydicarbonate, bis(4-t-butylcyclohexyl) peroxydicarbonate, di(sec-butyl) peroxydicarbonate, and di(2-ethylhexyl) peroxydicarbonate is more preferable, and at least one selected from the group consisting of di(sec-butyl) peroxydicarbonate and di(2-ethylhexyl) peroxydicarbonate is further more preferable, considering the availability of peroxydicarbonates and their effect, such as the (co)polymerizability of a polymerizable component and the randomization of the structure of a thermoplastic resin constituting the shell of microspheres.

The amount of the polymerization initiators is not specifically restricted, and the preferable amount ranges from 0.3 to 8 parts by weight to 100 parts by weight of the monomer component, more preferably from 0.4 to 7.5 parts by weight, further preferably from 0.5 to 7.5 parts by weight, further more preferably from 0.5 to 7 parts by weight, and most preferably from 0.8 to 7 parts by weight.

When a polymerization initiator contains another polymerization initiator in addition to a peroxydicarbonate, higher ratio of the peroxydicarbonate in the polymerization initiator brings more effect. The ratio of the peroxydicarbonate in a polymerization initiator should preferably not lower than 60 weight percent, more preferably not lower than 70 weight percent, further preferably not lower than 80 weight percent, further more preferably not lower than 90 weight percent, and most preferably 100 weight percent.

In the production method of the present invention, the oily mixture may further contain a chain transfer agent, organic pigment, and inorganic pigment and particles having hydrophobized surface.

The chain transfer agent is not specifically restricted, and includes, for example, mercaptan, indene, alpha-methylenestylene dimer, and terpinolene.

The organic pigment is not specifically restricted, and includes, for example, aluminium lakes, such as tartrazine, Sunset Yellow FCF, and Brilliant Blue FCF; zirconium lake, barium lake, Helindone Pink CN, Lithol Rubine BCA, Lake Red CBA, copper phthalocyanine blue, and Permanent Orange.

The inorganic pigment and particles having hydrophobized surface are not specifically restricted, and include, for example, those obtained by hydrophobizing the surface of titanium oxide, zinc oxide, zirconium oxide, magnesium oxide, iron oxide, cerium oxide, iron hydroxide, chromium oxide, chromium hydroxide, ultramarine pigment, iron blue pigment, manganese violet, ultramarine purple, titanium black, carbon black, aluminum powder, titanated mica, bismuth oxychloride, iron oxide coated titanated mica, iron blue coated titanated mica, mica carmine, silica, calcium carbonate, magnesium carboxylate, barium sulfate, barium silicate, calcium silicate, magnesium silicate, calcium phosphate, hydroxyapatite, zeolite, alumina, talc, mica, bentonite, kaolin, and sericite. The hydrophobizing treatment of the surface of a inorganic pigment and particles is not specifically restricted, and include, for example, wetting with silicone oils and surface treatment with a silane-coupling agent.

In the present invention, the aqueous dispersing medium mainly comprises deionized water for dispersing an oily mixture, and may further contain a hydrophilic organic solvent, such as alcohols. The amount of the aqueous dispersing medium is not specifically restricted, and should preferably range from 100 to 1000 parts by weight to 100 parts by weight of a polymerizable component.

The aqueous dispersing medium may further contain an electrolyte. The electrolyte is not specifically restricted, and includes, for example, lithium chloride, sodium chloride, potassium chloride, magnesium chloride, calcium chloride, sodium carbohydrate, lithium sulfate, sodium sulfate, potassium sulfate, magnesium sulfate, ammonium sulfate, sodium carbonate, and benzoic acid. One of or at least two of those electrolytes may be used. The amount of the electrolyte in an aqueous dispersing medium is not specifically restricted, and should preferably range from 0.1 to 50 parts by weight to 100 parts by weight of an aqueous dispersing medium.

In the present invention, the aqueous dispersing medium contains at least one water-soluble compound. The water-soluble compound is used as a polymerization auxiliary in the production method of heat-expandable microspheres. In the present invention, the term, "water-soluble", means that at least 1 g of a compound is soluble in 100 g of water. The water-soluble compound includes the following water-soluble compounds (1) to (4). One of or at least two of the water-soluble compounds may be used. The water-soluble compounds are described in detail as follows.

Water-soluble compound (1): water-soluble metal salts and/or their hydrates (hereinafter the "water-soluble metal salts and/or their hydrates" may sometimes be referred to as "water-soluble metal salts (hydrates)", for abbreviation.)

The water-soluble metal salts are those soluble in water.

The metals constituting the water-soluble metal salts are, for example, Group III metals, such as scandium and cerium; Group IV metals, such as titanium, zirconium, and hafnium; Group V metals, such as vanadium and tantalum; Group VI metals, such as chromium, molybdenum, and tungsten; Group VII metals, such as manganese and rhenium; Group VIII metals such as iron, ruthenium, and osmium; Group IX metals, such as cobalt and rhodium; Group X metals, such as nickel; Group XI metals such as silver and gold; Group XII metals, such as zinc and cadmium; Group XIII metals, such as boron, aluminium, gallium, indium, and thallium; Group XIV metal, such as tin and lead; and Group XV metals, such as arsenic, antimony, and bismuth. Among those metals, titanium, iron, aluminium, antimony, and bismuth are preferable; aluminium, iron, and antimony are more preferable; and antimony and aluminium are further more preferable. The classification of the metals described above is based on the "Periodic Table of Elements (2005)©, Atomic Weight Sub-Committee of The Chemical Society of Japan", which was bound at the end of "Kagaku-to Kyoiku (Chemistry and Education) vol. 54, No. 4, 2006".

The valence of the above-mentioned metals is not specifically restricted, and trivalent metals among the metals of various valences are preferable because they sufficiently attains the effect of the present invention, and their activity is not excessively high nor low, in other words, they exhibit proper activity. It is estimated that the trivalent metals do not directly participate in the radical polymerization mechanism of the oily polymerizable component but they function as an electron acceptor dissolved in water to accept, on the surface of suspended globules, electrons in polymerization, though the action and mechanism of the trivalent metals have not been clearly found. It is also estimated that, as the result of accepting electrons, the trivalent metals participate in the polymerization reaction by promoting the polymerization of the oily mixture and releasing the accepted electrons into water phase.

The water-soluble metal salts are not specifically restricted, and may include metal halides and further contain an organic group in their molecules. Halogens forming the metal halides are not specifically restricted, and include at least one selected from the group consisting of fluorine, chlorine, bromine, iodine, and astatine; preferably one selected from the group consisting of fluorine, chlorine, and bromine; more preferably chlorine or bromine; and further preferably chlorine.

An organic group which may be contained in the molecules of the metal halides include, for example, alkyl group, allyl group, hydroxyl group, alkoxy group, acyloxy group, amino group, nitro group, cyano group, phenyl group, phenoxy group, tolyl group, benzyl group, carboxyl group, thiocarboxyl group, thionyl group, thioacetyl group, mercapto group, sulfo group, sulfino group, mesyl group, tosyl group, triflate group, trifurylimide group, and acetylacetonato group.

Preferable metal halides are the halides of trivalent metals (metal (III) halides). The examples of the metal (III) halides are metal chlorides, such as aluminium (III) chloride, antimony (III) chloride, gallium (III) chloride, gold (III) chloride, cerium (III) chloride, thallium (III) chloride, tungsten (III) chloride, tantalum (III) chloride, titanium (III) chloride, iron (III) chloride, nickel (III) chloride, vanadium (III) chloride, bismuth (III) chloride, arsenic (III) trichloride, ruthenium (III) chloride, rhenium (III) chloride, and osmium (III) chloride; metal fluorides, such as aluminium (III) fluoride and manganese (III) fluoride; and metal bromides, such as aluminium (III) bromide and thallium (III) bromide. One of or at least two of these metal halides may be used.

Some of water-soluble metal salts, such as anhydrous aluminum chloride, reacts with water to generate hydrogen chloride, and may form a water-insoluble hydroxide according to the conditions, such as pH, of aqueous medium. Then the concentration of a metal dissolved in water, in this case, aluminum (III), is not known, and the generated hydrogen chloride corrodes a reactor made of metals. For such reasons, a hydrate of a water-soluble metal salt is preferable.

A hydrate of water-soluble metal salt has a water-coordinated complex structure in which a metal atom of a water-soluble metal salt exists at the center of the coordinated water molecules. The hydrate of a water-soluble metal salt is not specifically restricted and includes, for example, hydrates of metal halides mentioned above. One of or at least two of the hydrates of the water-soluble metal salts may be used.

Concrete examples of the hydrate of a water-soluble metal halide includes aluminum (III) chloride hexahydrate, chromium (III) chloride n-hydrate, cerium (III) chloride n-hydrate, thallium (III) chloride tetrahydrate, titanium (III) chloride n-hydrate, and aluminum (III) fluoride n-hydrate. The letter, "n", means a hydration number, which is the number of water molecules coordinated to a metallic element.

Water-soluble compound (2): water-soluble polyphenols

The water-soluble polyphenols are not specifically restricted, and include, for example, flavonoid, catechin, tannin, isoflavone, anthocyanin, rutin, chlorogenic acid, gallic acid, lycopene, quercetin, miricetin, taxifolin, their derivatives and polymers; and green tea extract, red wine extract, cacao extract, and sunflower seed extract which contain these polyphenols. The tannin may be any of hydrolyzable tannins including gallotannin, diphenylmethylolide tannin, and phlobaphene-generating condensed tannin. Tannic acid is a mixture of hydrolyzable tannins. One of or at least two of these water-soluble polyphenols may be used.

Water-soluble compound (3): water-soluble vitamin Bs

The water-soluble vitamin Bs are not specifically restricted, and include, for example, vitamin $B_1$ (thiamine), vitamin $B_2$ (riboflavin), vitamin $B_6$ (pyridoxine), vitamin $B_{12}$ (cobalamine), derivatives of those vitamin Bs converted into nucleotide or nucleoside; and inorganic acid salts, such as nitrates and chlorides. One of or at least two of these water-soluble vitamin Bs may be used.

Water-soluble compound (4): water-soluble 1,1-substituted compounds having a structure in which a hydrophilic functional group selected from the group consisting of hydroxyl group, carboxylic acid (salt) group, and phosphonic acid (salt) group, and a hetero atom are bonded to the same carbon atom The water-soluble 1,1-substituted compounds are not specifically restricted, and include, for example, aminopolycarboxylic acids (salts) having a structure formed by a carboxylic acid (salt) group as a hydrophilic functional group and a nitrogen atom as a hetero atom; and aminopolyphosphonic acids (salts) having a structure formed by a phosphonic acid (salt) group as a hydrophilic functional group and a nitrogen atom as a hetero atom.

The aminopolycarboxylic acids (salts) are not specifically restricted, and include, for example, aminopolycarboxylic acids such as ethylenediaminetetraacetic acid (including its salt), hydroxyethylethylenediaminetriacetic acid (including its salt), diethylenetriaminepentaacetic acid (including its salt), dihydroxyethylethylenediaminediacetic acid (including its salt), 1,3-propanediaminetetraacetic acid (including its salt), diethylenetriaminepentaacetic acid (including its salt), triethylenetetraaminehexaacetic acid (including its salt), nitrilotriacetic acid (including its salt), gluconic acid (including its salt), hydroxyethyliminodiacetic acid (including its salt), L-aspartate-N,N-diacetic acid (including its salt), dicarboxymethyl glutamic acid (including its salt), 1,3-diamino-2-hydroxypropanetetraacetic acid (including its salt), and dihydroxyethyl glycine (including its salt); their metal salts; and their ammonium salts. One of or at least two of these aminopolycarboxylic acids (salts) may be used.

The chemical structure of ethylenediaminetetraacetic acid (including its salt) mentioned above is shown in the following chemical formula (1).

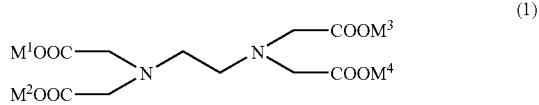

(1)

(where each of $M^1$ to $M^4$ is selected from the group consisting of hydrogen atom, alkali metals, alkaline earth metals, transition metals, ammonium groups, and primary, secondary, tertiary, and quaternary amine groups; and may be the same or different from each other)

The chemical structure of diethylenetriaminepentaacetic acid (including its salt) mentioned above is shown in the following chemical formula (2).

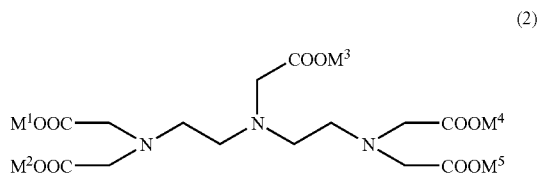

(2)

(where each of $M^1$ to $M^5$ is selected from the group consisting of hydrogen atom, alkali metals, alkaline earth metals, transition metals, ammonium groups, and primary, secondary, tertiary and quaternary amine groups; and may be the same or different from each other)

The aminopolyphosphonic acids (salts) are not specifically restricted, and include, for example, aminopolyphosphonic acids, such as aminotrimethylenephosphonic acid (including its salt), hydroxyethanephosphonic acid (including its salt), hydroxyethylidenediphosphonic acid (including its salt), dihydroxyethyl glycine (including its salt), phosphonobutanetriacetic acid (including its salt), methylenephosphonic acid (including its salt), nitrilotrimethylenephosphonic acid (including its salt), and ethylenediaminetetra(methylenephosphonic acid) (including its salt); their metal salts; and their ammonium salts. One of or at least two of these aminopolyphosphonic acids (salts) may be used.

The aminopolycarboxylic acid salts and aminopolyphosphonic acid salts mentioned above mean the metal salts, amine salts, and ammonium salts of aminopolycarboxylic acids and aminopolyphosphonic acids.

The metal salts mentioned above are the compounds in which at least one proton of their acid groups, such as carboxylic acid group and phosphonic acid group, is substituted with a metal atom. The metal atom includes, for example, alkali metals, such as lithium, sodium, and potassium (Group I metals in periodic table); alkaline earth metals, such as beryllium, magnesium, calcium, strontium, and barium (Group II metals in periodic table); and transition metals, such as iron, copper, manganese, zinc, and cobalt. Among those metal atoms, sodium and potassium are preferable, because their salts are easily available and used as food additives.

The amine salts mentioned above are the compounds in which at least one proton of their acid groups, such as carboxylic acid group and phosphonic acid group, reacts with an amine. The amine salts are also explained as the compounds in which at least one proton of their acid groups, such as carboxylic acid group and phosphonic acid group, is substituted with a primary, secondary, tertiary or quaternary amine group. The primary amine group mentioned here is obtained by reacting a primary amine with a proton, and has a charge of +1. The secondary amine group is obtained by reacting a secondary amine with a proton, and has a charge of +1; the tertiary amine group is obtained by reacting a tertiary amine with a proton, and has a charge of +1; and the quaternary amine group is obtained by substituting a proton of a tertiary amine group with a hydrocarbon group, and has a charge of +1.

The primary, secondary, and tertiary amines used as the raw materials for the primary, secondary, and tertiary amine groups are $C_{1-5}$ (mono, di, or tri) alkyl amine, such as ethyl amine and propyl amine; $C_{2-10}$ (mono, di, or tri) alkanol amine, such as monoethanol amine, diethanol amine, triethanol amine, monoisopropanol amine, diisopropanol amine, triisopropanol amine, and cyclohexyldiethanol amine; morpholine; $C_{5-20}$ cycloalkyl amine, such as dicyclohexyl amine; and 3,3-dimethylpropane diamine.

The quaternary amine group includes, for example, dodecyltrimethyl ammonium, coco-alkyltrimethyl ammonium, hexadecyltrimethyl ammonium, tallow-alkyltrimethyl ammonium, octadecyltrimethyl ammonium, behenyltrimethyl ammonium, coco-alkyldimethylbenzyl ammonium, tetradecyldimethylbenzyl ammonium, coco-alkyldimethylbenzyl ammonium, octadecyldimethylbenzyl ammonium, coco-alkyl ammonium, tetradecyl ammonium, octadecyl ammonium, triethylmethyl ammonium, dioleyldimethyl ammonium, didecyldimethyl ammonium, and triethylmethyl ammonium.

The ammonium salts mentioned above are the compounds obtained by reacting at least one proton of an acidic group, such as carboxylic acid group and phosphonic acid group, with ammonia. The ammonium salts may be explained as the compounds obtained by substituting the proton with an ammonium group ($—NH_4^+$).

Other water-soluble 1,1-substituted compounds are not specifically restricted, and include, for example, the compounds having a structure in which the hydrophilic functional group is a carboxylic acid (salt) group and the hetero atom is nitrogen atom, such as 2-carboxypyridine, orotic acid, quinolinic acid, lutidinic acid, isocinchomeronic acid, dipicolinic acid, berberonic acid, fusaric acid, and orotic acid; the compounds having a structure in which the hydrophilic functional group is a hydroxyl (salt) group and the hetero atom is nitrogen atom, such as 2-hydroxypyridine, 6-hydroxynicotine acid, and citrazinic acid; and the compounds having a structure in which the hydrophilic functional group is a carboxylic acid (salt) group and the hetero atom is sulfur atom, such as thiodiglycolic acid.

The water-soluble 1,1-substituted compounds having a carboxylic acid (salt) group and/or phosphonic acid (salt) group as a hydrophilic functional group, and nitrogen atom and/or sulfur atom as a heteroatom are preferable.

A water-soluble compound, which is at least one selected from the group consisting of the water-soluble compound (1), such as titanium (III) chloride, iron (III) chloride, aluminum (III) chloride hexahydrate, antimony (III) chloride, and bismuth (III) chloride; the water-soluble compound (2), such as tannin and gallic acid; the water-soluble compound (3), such as vitamin $B_2$ and vitamin $B_6$; and the water-soluble compound (4), such as ethylenediaminetetraacetic acid (including its salt), hydroxyethylethylenediaminetriacetic acid (including its salt), diethylenetriaminepentaacetic acid (including its salt), dihydroxyethylethylenediaminediacetic acid (including its salt), 1,3-propanediaminetetraacetic acid (including its salt), diethylenetriaminepentaacetic acid (including its salt), triethylenetetraaminehexaacetic acid (including its salt), nitrilotriacetic acid (including its salt), gluconic acid (including its salt), hydroxyethyliminodiacetic acid (including its salt), L-aspartate-N,N-diacetic acid (including its salt), dicarboxymethyl glutamic acid (including its salt), 1,3-diamino-2-hydroxypropanetetraacetic acid (including its salt), dihydroxyethyl glycine (including its salt), aminotrimethylenephosphonic acid (including its salt), hydroxyethanephosphonic acid (including its salt), dihydroxyethyl glycine (including its salt), phosphonobutanetriacetic acid (including its salt), methylenephosphonic acid (including its salt), nitrilotrimethylenephosphonic acid (including its salt), 2-carboxypyridine, orotic acid, quinolinic acid, lutidinic acid, isocinchomeronic acid, dipicolinic acid, berberonic acid, fusaric acid, orotic acid, 2-hydroxypyridine, 6-hydroxynicotine acid, citrazinic acid, and thiodiglycolic acid, is preferable for its stability and easy availability.

More preferable water-soluble compound is at least one selected from the group consisting of aluminum (III) chloride hexahydrate, antimony (III) chloride, bismuth (III) chloride, vitamin $B_6$, 2-carboxypyridine, 2-hydroxypyridine, 6-hydroxynicotine acid, orotic acid, thiodiglycolic acid, ethylenediaminetetraacetic acid (including its salt), and diethylenetriaminepentaacetic acid (including its salt).

Further more preferable water-soluble compound is at least one selected from the group consisting of aluminum (III) chloride hexahydrate, 2-carboxypyridine, 2-hydroxypyridine, 6-hydroxynicotine acid, orotic acid, ethylenediaminetetraacetic acid (including its salt), and diethylenetriaminepentaacetic acid (including its salt).

Among the water-soluble compounds from (1) to (4), the water-soluble compounds (1) and/or (4) are preferable. For employing at least two of the water-soluble compounds in polymerization, polymerization with any of the following combinations (A) to (C) is superior to polymerization with only one of the water-soluble compounds, regarding the effect for the maximum expanding ratio and repeated compression durability of microspheres, and the prevention of aggregated heat-expandable microspheres generated in polymerization and scale generated in a polymerization reactor.

(A) a combination containing at least two of the water-soluble compound (1)

(B) a combination containing at least two of the water-soluble compound (4)

(C) a combination containing at least one of the water-soluble compound (1) and at least one of the water-soluble compound (4)

The amount of the water-soluble compounds in the aqueous dispersing medium is not specifically restricted, and should range preferably from 0.0001 to 1.0 part by weight, more preferably from 0.0003 to 0.8 parts by weight, and further more preferably from 0.001 to 0.5 parts by weight, to 100 parts by weight of a polymerizable component. Insufficient amount of the water-soluble compounds may result in insufficient effect by the water-soluble compounds. Excessive amount of the water-soluble compounds may decrease polymerization rate or increase the amount of remaining raw material, the polymerizable component.

As mentioned above, the water-soluble compounds are used as a polymerization auxiliary, and inherently have a function to prevent aggregated heat-expandable microspheres generated in polymerization and scale generated in a polymerization reactor (specifically, filter clogging by polymer and aggregated material due to polymerized product firmly sticking on the outside of the shell of heat-expandable microsphere, and polymerized product sticking on the inside of a polymerization reactor, which are found in polymerization of a polymerizable component). With such water-soluble compounds, the production method of the present invention is excellent in the prevention of aggregated heat-expandable microspheres generated in polymerization and scale generated in a polymerization reactor.

In the present invention, the water-soluble compounds may be used in combination with other polymerization auxiliaries. Other polymerization auxiliaries include dichromates, such as ammonium dichromate, sodium dichromate, and potassium dichromate; alkali metal nitrites, such as sodium nitrite and potassium nitrite; and radical inhibitors, such as water-soluble ascorbic acid and its derivatives. Alkali metal nitrites are regulated by the Ordinance for Water Pollution Control Law for enforcing the Water Pollution Control Law of Japan. The ordinance defines the limit values of hazardous materials contained in ground water, and the limit of the sum of the amount of nitrite nitrogen and nitrate nitrogen is defined as 10 ppm. Thus in the conventional production methods for heat-expandable microspheres, in which nitrite salts are employed, waste water from reaction must be diluted with a lot of water or treated with active carbon or ion-exchange resin to absorb nitrite salts for the purpose of exhausting the waste water, when the amount of the nitrite salts in the waste water is higher than the limit.

In the production method of the present invention, the polymerizable component is polymerized in the aqueous dispersing medium containing the water-soluble compound, and it is effective to efficiently encapsulate a blowing agent, which is added in the production process, in heat-expandable microspheres without loss. In the production method of the present invention, the efficiency of retention (%), the calculation of which is specifically described in Examples, should preferably not lower than 88%, more preferably not lower than 90%, and further more preferably not lower than 95%.

The aqueous dispersing medium may contain the electrolyte, dispersion stabilizer, and dispersion stabilizing auxiliary mentioned above, in addition to the water-soluble compound.

The dispersion stabilizer is not specifically restricted, and includes, for example, water-insoluble inorganic compounds such as colloidal silica, colloidal calcium carbonate, magnesium hydroxide, calcium hydroxide, aluminum hydroxide, ferric hydroxide, calcium sulfate, barium sulfate, calcium oxalate, calcium methasilicate, calcium carbonate, barium carbonate, magnesium carbonate; phosphate salts such as calcium phosphate, magnesium phosphate, aluminum phosphate, and zinc phosphate, pyrophosphate salts such as calcium pyrophosphate, aluminum pyrophosphate, and zinc pyrophosphate, and alumina sol. One of or at least two of those dispersion stabilizers may be used, and their variants are selected according to the intended particle size of resultant heat-expandable microspheres and the dispersion stability in polymerization. Above all, calcium triphosphate, those obtained in metathesis reaction, such as magnesium pyrophosphate and calcium pyrophosphate, and colloidal silica are preferable.

The amount of the dispersion stabilizer is properly determined according to a target particle size and is not specifically restricted. The amount should preferably range from 0.1 to 20 parts by weight to 100 parts by weight of a polymerizable component, and more preferably from 2 to 10 parts by weight.

The dispersion stabilizing auxiliary is not specifically restricted, and includes, for example, polymer type dispersion stabilizing auxiliaries; and surfactants, such as cationic surfactants, anionic surfactants, amphoteric surfactants, and nonionic surfactants. One of or at least two of the dispersion stabilizing auxiliaries may be employed, and they are selected according to the particle size of resultant heat-expandable microspheres and the stability of dispersion in polymerization.

The polymer type dispersion stabilizing auxiliaries include, for example, a condensate of diethanol amine and aliphatic dicarboxylic acid, gelatin, polyvinyl pyrolidone, methyl cellulose, polyethylene oxide, and polyvinyl alcohol.

The cationic surfactants include, for example, alkyl amines, such as laurylamine acetate and stearylamine acetate; and quaternary ammonium salts, such as lauryltrimethylammonium chloride.

The anionic surfactants include, for example, fatty acid oils, such as sodium oleate and potassium castor oil; alkylsulfate salts, such as sodium laurylsulfate and ammonium laurylsulfate; alkylbenzenesulfonate salts, such as sodium dodecylbenzenesulfonate; alkylnaphthalenesulfonate salts; alkanesulfonate salts; dialkylsulfosuccinate salts; alkylphosphate salts; naphthalenesulfonic acid-formalin condensate; polyoxyethylene alkylphenylethersulfate salts; and polyoxyethylene alkylsulfate salts.

The amphoteric surfactants include, for example, alkyldimethyl aminoacetic acid betaine, alkyldihydroxyethyl aminoacetic acid betaine, and lauryldimethylamine oxide.

The nonionic surfactants include, for example, polyoxyethylene alkyl ether, polyoxyethylene alkylphenyl ether, polyoxyethylene fatty acid ester, sorbitan fatty acid ester, polyoxysorbitan fatty acid ester, polyoxyethylene alkylamine, glyceryl fatty acid ester, oxyethylene-oxypropylene block copolymer.

The amount of the dispersion stabilizing auxiliaries is not specifically restricted, and should preferably range from 0.0001 to 5 parts by weight, more preferably from 0.0003 to 2 parts by weight, to 100 parts by weight of a polymerizable component.

The aqueous dispersing medium is prepared by blending the water-soluble compound and optionally the dispersion stabilizer and/or dispersion stabilizing auxiliary in water such as deionized water. The pH of the aqueous dispersing medium in polymerization is properly determined according to the variants of a water-soluble compound, dispersion stabilizer, and dispersion stabilizing auxiliary. The aqueous dispersing medium in polymerization may be acidic, neutral, or alkaline, and should preferably be acidic or neutral, or more preferably be acidic. The pH of the aqueous dispersing medium in polymerization should normally range from 2 to 13, preferably from 2 to 10, more preferably from 2 to 8, further preferably from 2 to 6.5, further more preferably from 2 to 6, and most preferably from 2 to 4.

In the present invention, the oily mixture is dispersed and emulsified in the aqueous dispersing medium so as to form oil globules of intended particle size.

The methods for dispersing and emulsifying the oily mixture include generally known dispersion techniques, such as agitation with a Homo-mixer (for example, those manufactured by Tokushu Kika Kogyou) and a Homo-disper (for example, those manufactured by Tokushu Kika Kogyou), dispersion with a static dispersing equipment such as a Static mixer (for example, those manufactured by Noritake Engineering Co., Ltd.), membrane emulsification technique, ultrasonic dispersion, and microchannel emulsification.

One of the examples of the methods for dispersing and emulsifying the oily mixture is a method with a continuous high-speed high-shear type stirring and dispersing machine disclosed in JP-A-2000-191817. A preferable method is the one with a Clearmix, wherein a homogenizer constituted of a conical or truncated conical screen which has liquid-feeding opening of vertical slits, and of a conical or truncated conical rotor with blades which is fixed inside the screen with some clearance is used, and a hydrophobic substance and an aqueous dispersing medium are fed from the rotor side to be passed through the clearance between the rotor and the screen and through the liquid-feeding opening of the screen with high speed agitation by the rotor so as to disperse and emulsify the oily mixture in the aqueous dispersing medium (refer to the paragraphs 5 to 13 and the FIGS. 1 to 4 of JP-A-2004-959).

Then the suspension polymerization is started by heating the dispersion in which the oily mixture is dispersed into oil globules in the aqueous dispersing medium. It is preferable to agitate the dispersion during the polymerization reaction, and the agitation should be performed gently to a degree which prevents the floating of monomers and sedimentation of polymerized heat-expandable microspheres.

The polymerization temperature may be freely settled according to the variant of a polymerization initiator, and should preferably be controlled within the range from 30 to 100 deg.C., more preferably from 40 to 90 deg.C., and further more preferably from 50 to 85 deg.C. The reaction temperature should preferably be maintained for about 0.1 to 20 hours. Initial polymerization pressure is not specifically restricted, and should preferably be controlled within the range from 0 to 5.0 MPa in gauge pressure, more preferably from 0.1 to 3.0 MPa, and further more preferably from 0.2 to 2.0 MPa.

After polymerization reaction, the polymerization initiator may be optionally decomposed with hydrochloric acid and the like, and the resultant product (heat-expandable microspheres) is separated from the dispersion with some operation, such as suction filtration, centrifugal separation, or centrifugal filtration. Further the resultant wet cake of heat-expandable microspheres is washed with water and dried to obtain heat-expandable microspheres.

The method of producing heat-expandable microspheres of the present invention may further contain a step of adhering a particulate filler on the outer surface of the shell of microspheres. A particulate filler adhered onto the outer surface of the shell of microspheres contributes to improved dispersibility and flowability of microspheres in use.

The particulate filler may be either an organic or an inorganic filler, and the variant and amount of the particulate filler are selected according to the application of microspheres.

The organic particulate filler includes, for example, metal soaps, such as magnesium stearate, calcium stearate, zinc stearate, barium stearate, and lithium stearate; synthetic waxes, such as polyethylene wax, lauric acid amide, myristic acid amide, palmitic acid amide, stearic acid amide, and hydrogenated castor oil; and resin powders, such as polyacrylamide, polyimide, nylon, methyl polymethacrylate, polyethylene, and polytetrafluoroethylene.

The examples of inorganic fillers are those having a layered structure, such as talc, mica, bentonite, sericite, carbon black, molybdenum disulfide, tungsten disulfide, carbon fluoride, calcium fluoride, and boron nitride; and others, such as silica, alumina, isinglass, calcium carbonate, calcium hydroxide, calcium phosphate, magnesium hydroxide, magnesium phosphate, barium sulfate, titanium dioxide, zinc oxide, ceramic beads, glass beads, and crystal beads.

One of or at least two of the particulate fillers may be employed.

The average particle size of the particulate fillers is preferably not greater than one tenth of the average particle size of heat-expandable microspheres before adhering the particulate fillers. The average particle size mentioned here means the average particle size of primary particles.

The amount of a particulate filler adhered onto the heat-expandable microspheres is not specifically restricted, and should preferably range from 0.1 to 95 parts by weight, more preferably from 0.5 to 60 parts by weight, further more preferably from 5 to 50 parts by weight, and most preferably from 8 to 30 parts by weight to 100 parts by weight of heat-expandable microspheres before adhering the filler, considering the true specific gravity of heat-expandable microspheres and for optimizing the function of the particulate filler.

A particulate filler may is adhered onto heat-expandable microspheres by mixing heat-expandable microspheres and a particulate filler. The mixing process is not specifically restricted, and a device of a very simple mechanism, such as a vessel and paddle blades, is employable. Ordinary powder mixers for shaking or agitating powders are also applicable. The powder mixers include those which can shake and agitate, or agitate powders, such as ribbon-type mixers and vertical screw mixers. Highly efficient multi-functional powder mixers recently manufactured by combining several agitation devices, such as Super Mixer (manufactured by Kawata MFG Co., Ltd.), High-Speed Mixer (manufactured by Fukae Co., Ltd.), New-Gram Machine (manufactured by Seishin Enterprise Co., Ltd.), and SV mixer (manufactured by KOBELCO Eco-Solutions Co., Ltd.) may be used.

When a water-soluble metal salt (hydrate) is employed as the water-soluble compound in the production method of the present invention, the method is explained, from another technical viewpoint, as a method for producing heat-expandable microspheres comprising a shell of thermoplastic resin and a blowing agent encapsulated therein having a boiling point not higher than the softening point of the thermoplastic resin, which also comprises the steps of dispersing an oily mixture containing a polymerizable component and the blowing agent in an aqueous dispersing medium containing 0.001 to 100 ppm of an ion of at least one metal selected from the group consisting of scandium, cerium, titanium, zirconium, hafnium, vanadium, tantalum, chrome, molybdenum, tungsten, manganese, rhenium, iron, ruthenium, osmium, cobalt, rhodium, nickel, silver, gold, zinc, cadmium, boron, aluminum, gallium, indium, thallium, tin, lead, arsenic, antimony, and bismuth, and at least 0.001 ppm of a halide ion; and polymerizing the polymerizable component contained in the oily mixture.

The "at least one metal" is sometimes referred to as Metal A in the following description. In addition, the production method is sometimes referred to as the production method A. Metal A ion should preferably be a metal ion derived from a water-soluble metal salt (hydrate), and more preferably a metal ion derived from a metal halide and/or its hydrate. The above-mentioned description about the production method can apply directly to the production method A, except that described below.

The amount of Metal A ion contained in an aqueous dispersing medium should preferably range from 0.001 to 50 ppm, more preferably from 0.001 to 10 ppm, and further more preferably from 0.01 to 10 ppm. Insufficient amount of Metal A ion may fail to attain the effect of the present invention. On the other hand, excessive amount of Metal A ion may decrease polymerization rate or increase the amount of remaining raw material, a polymerizable component. The amount of a halide ion contained in the aqueous dispersing medium should preferably be not lower than 0.01 ppm, more preferably not lower than 0.1 ppm, and further more preferably not lower than 1 ppm. Insufficient amount of the halide ion may fail to attain the effect of the present invention.

The polymerization of a polymerizable component in an aqueous dispersing medium containing 0.001 to 100 ppm of Metal A ion and at least 0.001 ppm of a halide ion enables efficient production of heat-expandable microspheres which have high expanding ratio and are thermally expanded into hollow microparticulates having high durability against repeated compression. The production method A enables prevention of aggregated heat-expandable microspheres generated in polymerization and scale generated in a polymerization reactor.

For an aqueous dispersing medium which does not contain electrolytes including halide ions, such as lithium chloride, sodium chloride, potassium chloride, magnesium chloride, and calcium chloride, the amount of the halide ion should preferably range from 0.001 to 50 ppm, more preferably from 0.001 to 10 ppm, and further more preferably from 0.01 to 10 ppm.

[Heat-Expandable Microspheres and Their Application]

The heat-expandable microspheres of the present invention, as shown in FIG. 1, have a core-shell structure which comprises a shell 11 of thermoplastic resin and a blowing agent (core) 12 encapsulated therein having a boiling point not higher than the softening point of the thermoplastic resin, and the heat-expandable microspheres exhibit heat-expandability in whole (or a property of expanding under heating in whole). The thermoplastic resin, the polymerizable component which polymerizes to form thermoplastic resin, and the blowing agent are those described above.

The maximum expanding ratio of heat-expandable microspheres of the present invention is not lower than 50 times, preferably not lower than 55 times, more preferably not lower than 60 times, further preferably not lower than 65 times, further more preferably not lower than 70 times, and most preferably not lower than 75 times. Heat-expandable microspheres having a maximum expanding ratio lower than 50 times are not preferable, because such microspheres have poor thermal expanding performance, insufficiently increase their volume when they are thermally expanded, and may result in poor retention of a blowing agent and poor solvent resistance.

The expanding ratio is usually the most basic property of heat-expandable microspheres, and an indispensable property for heating and expanding heat-expandable microspheres to produce hollow particulates to be employed for lightening application or increasing volume. The expanding ratio is given with various definitions, and the maximum expanding ratio is defined as the percentage calculated by dividing the true specific gravity of hollow particulates at their maximum expansion by the true specific gravity of heat-expandable microspheres before expansion.

High expanding ratio of heat-expandable microspheres at their maximum expansion means that such heat-expandable microspheres can retain a blowing agent encapsulated in their shell without leakage when the shell becomes thinner with the advancement of expansion. In other words, high expanding ratio of heat-expandable microspheres at their maximum expansion means that excellent shell, which has high expanding and blowing-agent-retaining performance, is formed. Heat-expandable microspheres having excellent shell are known to have high solvent resistance and not to lose their heat-expanding performance when they are exposed to various solvents. Thus the expanding ratio of heat-expandable microspheres at their maximum expansion is a very important property for evaluating the properties of heat-expandable microspheres.

The hollow particulates obtained by thermally expanding the heat-expandable microspheres of the present invention should have a repeated-compression durability not lower than 75 percent, preferably not lower than 78 percent, more preferably not lower than 80 percent, further preferably not lower than 83 percent, further more preferably not lower than 85 percent, and most preferably not lower than 88 percent. Heat-expandable microspheres converted into hollow particulates having a repeated-compression durability lower than 75% reduce the properties, such as lightening effect, porosity, sound absorbency, thermal insulation performance, thermal conductivity, design effect, and strength, of molded articles or formed material like coating film produced from the heat-expandable microspheres, and also reduce the performance for retaining a blowing agent and solvent resistance of the hollow particulates.

The repeated-compression resistance of hollow particulates, which are obtained by thermally expanding heat-expandable microspheres and have a true specific gravity within the range of 0.025+/−0.001 g/cc, is determined according to the measuring method explained in detail in Examples. Hollow particulates for measuring repeated compression durability are produced by thermally expanding heat-expandable microspheres in the internal jetting method mentioned below, one of dry thermal expanding methods, as described in Examples. The internal jetting method is employed because dry hollow particulates are obtained without a step of drying hollow particulates, the step which is contained in wet thermal expanding method, and the resultant hollow particulates have excellent dispersibility.

Heat-expandable microspheres before expansion usually have a true specific gravity about 1 g/cc. The maximum expanding ratio of the heat-expandable microspheres of the present invention is not lower than 50 times, and thus the resultant hollow particulates have a true specific gravity about 0.02 g/cc or less when the microspheres expand to their maximum. Actually, hollow particulates having a true specific gravity of about 0.02 g/cc do not clearly exhibit the difference between superior and inferior particulates in the evaluation of repeated compression durability. On the other hand, hollow particulates having a true specific gravity within the range of 0.025+/−0.001 g/cc, which possibly have not been expanded to their maximum, are easily tested in the evaluation of repeated-compression durability to clearly exhibit the difference between superior and inferior particulates because of their insufficient expansion. Under such situation, the repeated-compression durability of hollow particulates having a true specific gravity within the range of 0.025+/−0.001 g/cc is determined.

The repeated-compression durability is a physical property for evaluating the durability of hollow particulates against the stress generated in mixing a base component mentioned below and hollow particulates or in forming a composition comprising the base component and hollow particulates. Evaluation of the repeated-compression durability of hollow particulates is the same as evaluation of the durability of the shell of hollow particulates against repeated bending. High durability of a shell of hollow particulates against repeated bending means that the shell of hollow particulates is formed of thermoplastic resin having materially uniform property, and does not locally become fragile when it is bent repeatedly. The materially uniform property of the shell of hollow microspheres means that the shell of the raw material of such hollow particulates, i.e., heat-expandable microspheres, is really formed in good quality with materially uniform property. It has already been found that heat-expandable microspheres having a shell of good quality and materially uniform property have high solvent resistance and do not lose thermal expanding performance even after they are exposed to various solvents. On the contrary, a shell having nonuniform material property and containing fragile parts may lead to reduced thermal expanding performance of microspheres, because such shell results in shooting of a blowing agent through the fragile parts or swelling of the shell which starts from the fragile parts when the shell is exposed to various solvents.

As mentioned above, hollow particulates and their raw material, i.e., heat-expandable microspheres which have high repeated-compression durability exhibit high durability against the stress, which is generated when the hollow particulates and/or heat-expandable microspheres are mixed with a base component or a composition comprising a base component and the hollow particulates and/or heat-expandable microspheres is molded or coated, and are not easily ruptured from the stress.

Further, the heat-expandable microspheres should preferably have the following properties.

The average particle size of the heat-expandable microspheres may be freely designed according to their application, and therefore is not specifically restricted. The average particle size normally ranges from 1 to 100 micrometer, preferably from 2 to 80 micrometer, more preferably from 3 to 60 micrometer, and further more preferably from 5 to 50 micrometer.

The coefficient of variation, CV, of the particle size distribution of heat-expandable microspheres is not specifically restricted, and it is preferably 35 percent or less, more preferably 30 percent or less, and further more preferably 25 percent or less. The coefficient of variation, CV, is calculated by the following expressions (1) and (2):

$$CV = (s/<x>) \times 100 \text{ (percent)} \quad (1)$$

$$s = \left\{ \sum_{i=1}^{n} (xi - <x>)^2 / (n-1) \right\}^{1/2} \quad (2)$$

where s is a standard deviation of particle size, <x> is an average particle size, xi is a particle size of an i-th particulate, and n is the number of particulates.

The retention of a blowing agent encapsulated in heat-expandable microspheres is not specifically restricted as it may be designed freely according to their application, and the retention should preferably range from 2 to 60 weight percent to the weight of heat-expandable microspheres, more preferably from 5 to 50 weight percent, and further more preferably from 8 to 45 weight percent.

The heat-expandable microspheres of the present invention can be produced in the production method mentioned above, though the method is not restricted within the scope of the production method. The heat-expandable microspheres of the present invention may be produced in other methods, for example, interfacial polymerization, reversed-phase emulsification, and emulsion polymerization. In addition, they may be produced in a method without making globules in an aqueous dispersing medium, for example, submerged drying, coacervation, spray drying, and dry mixing. Further they may be produced by graft-polymerizing a polymer on the shell of heat-expandable microspheres produced in a method which is different from the method of the present invention.

Heat-expanded microspheres (hollow particulates) are produced by heating and expanding the heat-expandable microspheres of the present invention and/or the heat-expandable microspheres produced in the production method of the present invention. The production method for the hollow particulates is not specifically restricted, and may be produced in either dry heating and expanding method or wet heating and expanding method.

An example of the dry heating and expanding method is the internal jetting method described in JP A 2006-213930. The internal jetting method is a dry heating and expanding method, which comprises the steps of feeding a gas fluid containing heat-expandable microspheres through a gas-introducing tube having a dispersion nozzle on its outlet and being fixed inside hot gas flow, and then jetting the gas flow from the dispersion nozzle (jetting step); making the gas fluid collide on a collision plate fixed on a downstream position of the dispersion nozzle to disperse the heat-expandable microspheres in the hot gas flow (dispersing step); and heating the dispersed heat-expandable microspheres in the hot gas flow at a temperature not lower than their expansion initiating temperature and thus expanding the heat-expandable microspheres (expanding step). The internal jetting method is preferable because it produces hollow particulates of uniform property regardless of the variants of thermoplastic resin which forms the shell of the raw material, heat-expandable microspheres. The detail of the internal jetting method is described in an Example.

Another dry heating and expanding method is described in JP A 2006-96963, and a wet heating and expanding method is described in JP A 62-201231.

The average particle size of the hollow particulates may be freely designed according to their application, and therefore is not specifically restricted. The average particle size should preferably range from 1 to 1000 micrometer, more preferably from 5 to 800 micrometer, and further more preferably from 10 to 500 micrometer. The coefficient of variation, CV, of the particle size distribution of the hollow particulates is not specifically restricted, and it should preferably be 30 percent or less, more preferably 27 percent or less, and further more preferably 25 percent or less.

The composition of the present invention comprises a base component and heat-expandable microspheres and/or hollow particulates.

The base component is not specifically restricted, and include, for example, rubbers, such as natural rubber, butyl rubber, and silicone rubber; thermosetting resins, such as epoxy resins and phenol resins; sealing materials, such as modified silicone, urethane, polysulfide, acrylic, and silicone polymers; paint components, such as ethylene-vinyl acetate copolymer, vinyl chloride polymer, and acrylic polymer; inorganic materials, such as cement, mortar, and cordierite. The composition of the present invention is prepared by mixing the base component and heat-expandable microspheres and/or hollow particulates.

The application of the composition of the present invention includes, for example, a molding composition, paint composition, clay composition, fiber composition, adhesive composition, and powder composition.

The formed products of the present invention are produced by molding or forming the composition. The formed products of the present invention include, for example, molded articles and formed products like coating film. The formed products of the present invention have improved lightening effect, porosity, sound absorbency, thermal insulation performance, thermal conductivity, electrical conductivity, design effect, shock absorption performance, and strength.

EXAMPLE

The present invention is described specifically with the following examples, though the present invention is not restricted within the scope of those examples.

The properties of the heat-expandable microspheres and hollow particulates produced in the following Examples and Comparative examples were measured and their performance was further evaluated in the procedure described below.

[Determination of Average Particle Size and Particle Size Distribution]

A laser diffraction particle size analyzer (HEROS & RODOS, manufactured by SYMPATEC) was employed as the device for the determination. Microspheres were analyzed in dry system with a dry dispersion unit, where the dispersion pressure was controlled at 5.0 bar and the degree of vacuum was controlled at 5.0 mbar. The median particle size (D50 value) was determined as an average particle size.

[Determination of Moisture Content of Heat-Expandable Microspheres]

The moisture content was determined with a Karl Fischer moisture meter (MKA-510N, produced by Kyoto Electronics Manufacturing Co., Ltd.).

[Determination of Retention of Blowing Agent Encapsulated in Heat-Expandable Microspheres]

1.0 g of heat-expandable microspheres was placed in a stainless steel evaporating dish 15 mm deep and 80 mm in diameter, and weighed out ($W_1$). Then 30 ml of acetonitrile was added to disperse the microspheres uniformly. After being left for 30 minutes at room temperature, the microspheres were dried at 120 degree.C. for 2 hours, and the dry weight ($W_2$) was determined. The retention of encapsulated blowing agent was calculated by the following expression.

$$\text{Retention of encapsulated blowing agent (weight percent)} = (W_1 - W_2)(g)/1.0(g) \times 100 - (\text{moisture content}) \text{ (weight percent)}$$

(The moisture content in the expression was determined by the method described above.)

[Calculation of Efficiency of Retention]

The efficiency of retention of a blowing agent is the ratio of the retention ($G_2$) of a blowing agent encapsulated in heat-expandable microspheres produced by polymerizing an oily mixture to the weight ratio ($G_1$) of the blowing agent to the weight of the oily mixture before the polymerization; and is calculated by the following expression.

$$\text{Efficiency of retention (percent)} = G_2/G_1 \times 100$$

[Determination of True Specific Gravity]

The true specific gravity of heat-expandable microspheres and hollow particulates obtained by thermally expanding the microspheres was determined with the following method.

The true specific gravity was determined with the liquid substitution method (Archimedean method) with isopropyl alcohol in an atmosphere at 25 degree.C. and 50% RH (relative humidity).

Specifically, an empty 100-cc measuring flask was dried and weighed ($WB_1$). Isopropyl alcohol was poured into the weighed measuring flask accurately to form meniscus, and the measuring flask filled with isopropyl alcohol was weighed ($WB_2$).

Then the 100-cc measuring flask was emptied, dried, and weighed ($WS_1$). About 50 cc of particles were filled into the weighed measuring flask, and the measuring flask filled with the particles was weighed ($WS_2$). Then isopropyl alcohol was poured into the measuring flask filled with the particles accurately to form meniscus without taking bubbles into the isopropyl alcohol, and the flask filled with the particles and isopropyl alcohol was weighed ($WS_3$). The values, $WB_1$, $WB_2$, $WS_1$, $WS_2$, and $WS_3$, were introduced into the following expression to calculate the true specific gravity (d) of the particles.

$$d = \{(WS_2 - WS_1) \times (WB_2 - WB_1)/100\}/\{(WB_2 - WB_1) - (WS_3 - WS_2)\}$$

Heat-expandable microspheres and hollow particulates were tested as the particles in the above-mentioned method to calculate their true specific gravity.

[Determination of Expansion Initiating Temperature and Maximum-Expanding Temperature]

Those properties were determined with DMA (a kinetic viscoelasticity measuring device: DMA Q800, manufactured by TA Instruments). In an aluminum cup 4.8 mm deep and 6.0 mm in diameter (5.65 mm in inside diameter), 0.5 mg of heat-expandable microspheres were placed, and an aluminum lid 0.1 mm thick and 5.6 mm in diameter was placed on the cup to prepare a sample. The sample was subjected to a pressure of 0.01 N with a compression unit, and the height of the sample was measured. The sample was then heated at elevating temperature at the rate of 10 degree.C./min from 20 to 300 degree.C., being subjected to the pressure of 0.01 N with the compression unit, and the vertical change of the position of the compression unit was determined. The temperature at which the compression unit started to change its position to the positive direction was determined as an expansion initiating temperature, and the temperature at which the compression unit indicated the greatest change was determined as the maximum-expanding temperature.

[Determination of True Specific Gravity of Microspheres Expanded to Their Maximum]

A flat 12 cm long, 13 cm wide, and 9 cm high box was made of aluminium foil, and 1.0 g of heat-expandable microspheres were filled into uniform thickness. Then the heating of the microspheres was started at the expansion initiating temperature obtained in the measuring method mentioned above, and the heating temperature was raised by 5 deg.C. to heat the microspheres for 1 minute at each temperature level. The true specific gravity of the expanded microspheres (hollow particulates) at each temperature level was determined in the same manner as in the determination method of true specific gravity mentioned above. The lowest true specific gravity among several results was determined as the true specific gravity of microspheres expanded to their maximum.

[Evaluation of Expanding Ratio of Microspheres Expanded to Their Maximum]

The expanding ratio (times) of microspheres expanded to their maximum was calculated by introducing the true specific gravity of heat-expandable microspheres before expanding ($d_c$) and the true specific gravity of the microspheres expanded to their maximum ($d_{max}$), which were determined in the same manner as that for determining the true specific gravity mentioned above, in the following expression.

Expanding ratio at maximum expansion (times)=$d_c/d_{max}$

[Repeated-Compression Durability]

As mentioned above, the internal jetting method described in JP A 2006-213930 was employed for producing hollow particulates to determine their repeated-compression durability. Specifically, the production was carried out in the following procedure with the manufacturing equipment equipped with the expanding device shown in FIG. 2. Then the repeated-compression durability of the resultant hollow particulates was determined in the following method.

(Description of Expanding Device)

The expanding device comprises a gas introducing tube (without a reference numeral) equipped with a dispersion nozzle 4 on its outlet and fixed at the center of the equipment, a collision plate 5 set on a downstream position of the dispersion nozzle 4, an overheating preventive tube 3 fixed around the gas introducing tube with some distance, and a hot gas nozzle 1 fixed around the overheating preventive tube 3 with some distance. At the expanding device, a gas fluid 6 containing heat-expandable microspheres is flowed through the gas introducing tube in the direction marked with the arrow, and a gas flow 7 is flowed through the space between the gas introducing tube and the overheating preventive tube 3 in the direction marked with the arrow in order to improve the dispersion of heat-expandable microspheres and to prevent the overheating of the gas introducing tube and collision plate. In addition, hot gas flow 8 for thermal expansion is supplied in the direction marked with the arrow in the space between the overheating preventive tube 3 and the hot gas nozzle 1. Here the hot gas flow 8, gas fluid 6, and gas flow 7 usually flow in the same direction. In the overheating preventive tube 3, cooling medium flow 2 is flowed for cooling in the direction marked with the arrow.

(Operation of Manufacturing Equipment)

At the jetting step, the gas fluid 6 containing heat-expandable microspheres was flowed through the gas introducing tube equipped with the dispersion nozzle 4 on its outlet and fixed at the inside of the hot gas flow 8, and the gas fluid 6 was jetted from the dispersion nozzle 4.

At the dispersing step, the gas fluid 6 collided to the collision plate 5 fixed on a downstream position of the dispersion nozzle 4 so as to disperse the heat-expandable microspheres uniformly in the hot gas flow 8. The gas fluid 6 emitted from the dispersion nozzle 4 was lead to the collision plate 5 with the gas flow 7, and was made collide to the plate.

At the expanding step, the dispersed heat-expandable microspheres were heated and expanded in the hot gas flow 8 at a temperature not lower than the expansion initiating temperature of the microspheres. Then the resultant hollow particulates were cooled with some means, such as passing them through a cooling zone, and collected.

(Method of Setting the Production Parameters for Hollow Particulates)

At first, the parameters, such as the feeding rate of raw material heat-expandable microspheres, flow rate of hot gas, and amount of gas fluid containing the raw material, were settled at certain values, and the temperature of hot gas flow (hereinafter sometimes referred to as "hot gas temperature") was changed. Then heat-expandable microspheres were expanded at different temperature levels by changing the hot gas temperature stepwise, while other parameters were settled at certain values. Then the true specific gravity of the resultant particulates was determined, and a graph showing the relation between the hot gas temperature and the true specific gravity was prepared by plotting the hot gas temperature on x-axis and the true specific gravity on y-axis.

For producing expanded microspheres having an intended true specific gravity (within the range of 0.025+/−0.001 g/cc), the hot gas temperature was settled at the level corresponding to the intended true specific gravity on the graph mentioned above. Thus hollow particulates having a true specific gravity within the range of 0.025+/−0.001 g/cc were produced with the expanding parameters controlled in such manner.

[Determination of Repeated-Compression Durability]

In an aluminum cup 4.8 mm deep and 6 mm in diameter (having an inside diameter of 5.65 mm), 2.00 mg of hollow particulates obtained in the above procedure were placed, and an aluminum lid 0.1 mm thick and 5.6 mm in diameter was placed on the hollow particulates to prepare a sample. Then the sample was tested with DMA (DMA Q800, produced by TA Instruments), where the sample was compressed on its aluminum lid with a compression unit at 25 degree.C. being subjected to a pressure of 2.5 N, and the thickness of the layer of the hollow particulates, $L_1$, was determined. Then the pressure was raised from 2.5 N to 18 N at a rate of 10 N/min, followed with the reduction of the pressure from 18 N to 2.5 N at a rate of 10 N/min. The pressure raising and reducing operation were repeated 7 times, and the thickness of the layer of the hollow particulates, $L_2$, which was subjected to the pressure of 2.5 N on the aluminum lid with the compression unit, was determined. Then the ratio between $L_1$ and $L_2$, the determined thickness of the layers of the hollow particulates, was defined as repeated-compression durability as shown by the following expression.

Repeated-compression durability (percent)=$(L_2/L_1) \times 100$

[Determination of Density of Formed Products]

The density of a formed product was determined with an Analytical balance AX 200 and a Specific gravity measuring kit SMK-301 manufactured by Shimadzu Corporation.

[Calculation of Lightened Ratio of Expanded Formed Products]

The density of a formed product $D_B$ (g/cm3) and the density of a resin without heat-expandable microspheres $D_A$ (g/cm$^3$) were determined in the same manner as in the above-mentioned determination of formed products. The result was introduced in the following expression and calculated.

Lightened ratio (%) $((D_A - D_B) \times 100/D_A)$

Example A1

An aqueous dispersing medium was prepared by adding 100 g of sodium chloride, 80 g of colloidal silica containing 20 weight percent of silica as effective ingredient, 0.1 g of polyvinylpyrolidone, and 0.5 g of 1-% aqueous solution of ethylenediaminetetraacetic acid tetrasodium salt to 600 g of deionized water, and controlling the pH of the mixture at 2.8 to 3.2.

Apart from it, an oily mixture was prepared by mixing 180 g of acrylonitrile, 105 g of methacrylonitrile, 15 g of methyl methacrylate, 1.5 g of ethyleneglycol dimethacrylate, 75 g of isopentane, and 1 g of 2,2'-azobis isobutyronitrile. The aqueous dispersing medium and the oily mixture were mixed, and the mixed liquid was dispersed into a suspension with a Homomixer (T.K. Homo-mixer manufactured by Tokushu Kika Kogyou) at 5000 rpm for 5 minutes. Then the suspension was transferred into a compressive reactor of 1.5 liter capacity, purged with nitrogen, and polymerized at 70 deg.C. for 20 hours by agitating at 80 rpm and controlling the initial reaction pressure at 0.5 MPa. After the polymerization, the polymerized product was filtered and dried to obtain heat-expandable microspheres.

The suspension in the polymerization reaction was stable enough, and the reaction mixture after the polymerization was in good state without abnormal properties. When the reaction mixture was drawn out after the polymerization, polymerized product sticking on the inside wall of the reactor was not observed. The properties of the resultant heat-expandable microspheres are described in Table 1.

Examples A2 to A22 and Comparative Examples A1 to A9

In Examples A2 to A22 and Comparative examples A1 to A9, heat-expandable microspheres were produced by polymerizing in the same manner as in Example A1 except that each of the reacting conditions was changed as shown in Tables 1 to 7.

The properties of the resultant heat-expandable microspheres are described in Tables 1 to 7 in the same manner as in Example A1. In the Comparative examples A1 to A3, most of the resultant polymerized products aggregated and/or solidified, and the properties of the resultant heat-expandable microspheres could not be determined.

Example B1

An aqueous dispersing medium was prepared by adding 100 g of sodium chloride, 80 g of colloidal silica containing 20 weight percent of silica as effective ingredient, 0.1 g of polyvinylpyrolidone, and 0.5 g of 1-% aqueous solution of aluminum chloride hexahydrate (AlCl$_3$.6H$_2$O) as a water-soluble compound to 600 g of deionized water, and controlling the pH of the mixture at 2.8 to 3.2. The amount of aluminum ion in the aqueous dispersing medium was 1.7 ppm and the amount of chloride ion was $1.0 \times 10^5$ ppm.

Apart from it, an oily mixture was prepared by mixing 180 g of acrylonitrile, 105 g of methacrylonitrile, 15 g of methylmethacrylate, 1.5 g of ethyleneglycol dimethacrylate, 75 g of isopentane, and 1 g of 2,2'-azobis isobutyronitrile. The aqueous dispersing medium and the oily mixture were mixed, and the mixed liquid was dispersed into a suspension with a Homomixer (T.K. Homo-mixer manufactured by Tokushu Kika Kogyou) at 5000 rpm rotational rate for 5 minutes. Then the suspension was transferred into a compressive reactor of 1.5 liter capacity, purged with nitrogen, and polymerized at 70 deg.C. for 20 hours by agitating at 80 rpm and controlling the initial reaction pressure at 0.5 MPa. After the polymerization, the polymerized product was filtered and dried to obtain heat-expandable microspheres.

The suspension in the polymerization reaction was stable enough, and the reaction mixture after the polymerization was in good state without abnormal properties. When the reaction mixture was drawn out after the polymerization, polymerized product sticking on the inside wall of the reactor was not observed. The properties of the resultant heat-expandable microspheres are described in Table 8.

Examples B2 to B9 and Comparative Examples B1 to B4

In Examples B2 to B9 and Comparative examples B1 to B4, heat-expandable microspheres were produced by polymerizing in the same manner as in Example B1 except that each of the reacting conditions was changed as shown in Tables 8 and 9.

The properties of the resultant heat-expandable microspheres are shown in Tables 8 and 9. In the Comparative examples B1 to B3, most of the resultant polymerized products aggregated and/or solidified, and the properties of the resultant heat-expandable microspheres could not be determined.

As in Comparative example B4, the reaction with sodium nitrite brought satisfactory result, but about 90 ppm of nitrite ion was detected in the filtrate after draining the reacted slurry. Such nitrite ion concentration does not meet the limit value of 10 ppm for the sum of nitrite nitrogen and nitrate nitrogen, which is defined as a limit value for hazardous materials in ground water regulated by the Ordinance for Water Pollution Control Law. Thus the filtrate had to be further diluted or treated with active carbon or ion-exchange resin to adsorb the nitrite ion.

Example C1

An aqueous dispersing medium was prepared by adding 20 g of sodium chloride, 80 g of colloidal silica containing 20 weight percent of silica as effective ingredient, 3 g of diethanol amine-adipic acid condensate (50 weight percent), 20 g of 1-% aqueous solution of 2-carboxypyridine, and 10 g of 1-% aqueous solution of ethylenediaminepentaacetic acid pentasodium salt to 600 g of deionized water, and controlling the pH of the mixture at 2.8 to 3.2.

Apart from it, an oily mixture was prepared by mixing 160 g of acrylonitrile, 100 g of methyl methacrylate, 40 g of methyl acrylate, 1.0 g of ethyleneglycol dimethacrylate, 80 g of isobutane, and 2 g of di-2-ethylhexyl peroxydicarbonate. The aqueous dispersing medium and the oily mixture were mixed, and the mixed liquid was dispersed into a suspension with a Homomixer (T.K. Homo-mixer manufactured by Tokushu Kika Kogyou) at 8000 rpm for 5 minutes. Then the suspension was transferred into a compressive reactor of 1.5 liter capacity, purged with nitrogen, and polymerized at 55 deg.C. for 20 hours by agitating at 80 rpm and controlling the initial reaction pressure at 0.5 MPa. After the polymerization, the polymerized product was filtered and dried to obtain heat-expandable microspheres.

The suspension in the polymerization reaction was stable enough, and the reaction mixture after the polymerization was in good state without abnormal properties. When the reaction mixture was drawn out after the polymerization, polymerized product sticking on the inside wall of the reactor was not observed. The properties of the resultant heat-expandable microspheres are described in Table 10.

Examples C2 to C6

In Examples C2 to C6, heat-expandable microspheres were produced by polymerizing in the same manner as in Example C1 except that each of the reacting conditions was changed as shown in Tables 10.

The properties of the resultant heat-expandable microspheres are described in Table 10 in the same manner as in Example C1.

TABLE 1

| | | | Ex. A1 | Ex. A2 | Ex. A3 | Ex. A4 | Ex. A5 | Ex. A6 |
|---|---|---|---|---|---|---|---|---|
| Aqueous dispersing medium | Water soluble compound | Variant | EDTA | GLDA | PBTC | Thiodiglycolic acid | 2-hydroxy pyridine | Vitamin $B_2$ |
| | | 1-% aq. soln. (g) | 0.5 | 0.5 | 0.9 | 0.9 | 0.9 | 0.9 |
| | Deionized water (g) | | 600 | 600 | 600 | 600 | 600 | 600 |
| | NaCl (g) | | 100 | 100 | 100 | 100 | 100 | 100 |
| | Colloidal silica (g) | | 80 | 80 | 80 | 80 | 80 | 80 |
| | Polyvinyl pyrolidone (g) | | 0.1 | 0.1 | 0.1 | 0.1 | 0.1 | 0.1 |
| | Adipic acid-diethanol amine condensate | | — | — | — | — | — | — |
| | pH | | 3.0 | 3.0 | 3.0 | 3.0 | 3.0 | 3.0 |
| Monomer component | AN (g) | | 180 | 180 | 180 | 180 | 180 | 180 |
| | MAN (g) | | 105 | 105 | 105 | 105 | 105 | 105 |
| | MMA (g) | | 15 | 15 | 15 | 15 | 15 | 15 |
| | MA (g) | | — | — | — | — | — | — |
| | V $Cl_2$ (g) | | — | — | — | — | — | — |
| | IBX (g) | | — | — | — | — | — | — |
| | MAA (g) | | — | — | — | — | — | — |
| | PMI (g) | | — | — | — | — | — | — |
| Cross-linking agent | EDMA | | 1.5 | 1.5 | 1.5 | 1.5 | 1.5 | 1.5 |
| | TMP | | — | — | — | — | — | — |
| | 4EG-A | | — | — | — | — | — | — |
| Blowing agent | Isobutane | | — | — | — | — | — | — |
| | Isopentane | | 75 | 75 | 75 | 75 | 75 | 75 |
| Initiator | AIBN (g) | | 1 | 1 | 1 | 1 | 1 | 1 |
| | S(BP) (g) | | — | — | — | — | — | — |
| | OPP (g) | | — | — | — | — | — | — |
| | IPP (g) | | — | — | — | — | — | — |
| Mixer rotating speed (rpm) | | | 5000 | 5000 | 5000 | 5000 | 5000 | 5000 |
| Polymerization temp. (deg. C.) | | | 70 | 70 | 70 | 70 | 70 | 70 |
| Average particle size (μm) | | | 34 | 33 | 33 | 34 | 33 | 34 |
| Retention (wt %) | | | 19.1 | 19.1 | 19.3 | 19.1 | 19.1 | 18.5 |
| Efficiency of retention (%) | | | 96 | 96 | 97 | 96 | 96 | 93 |
| Maximum expanding ratio (times) | | | 70 | 69 | 74 | 70 | 71 | 63 |
| Repeated compression durability (%) | | | 89 | 88 | 90 | 90 | 91 | 86 |
| Stability of suspension in polymerization | | | good | good | good | good | good | good |
| Polymerized product sticking on wall inside a reactor | | | none | none | none | none | none | none |
| State of reaction mixture after polymerization | | | *1 | *1 | *1 | *1 | *1 | *1 |

TABLE 2

| | | | Comp. ex. A1 | Comp. ex. A2 | Comp. ex. A3 |
|---|---|---|---|---|---|
| Aqueous dispersing medium | Water soluble compound | Variant 1-% aq. soln. (g) | none — | Sodium ascorbate 0.9 | Sodium nitrite 15.0 |
| | Deionized water (g) | | 600 | 600 | 600 |
| | NaCl (g) | | 100 | 100 | 100 |
| | Colloidal silica (g) | | 80 | 80 | 80 |
| | Polyvinyl pyrolidone (g) | | 0.1 | 0.1 | 0.1 |
| | Adipic acid-diethanol amine condensate | | — | — | — |
| | pH | | 3.0 | 3.0 | 3.0 |
| Monomer component | AN (g) | | 180 | 180 | 180 |
| | MAN (g) | | 105 | 105 | 105 |
| | MMA (g) | | 15 | 15 | 15 |
| | MA (g) | | — | — | — |
| | V Cl$_2$ (g) | | — | — | — |
| | IBX (g) | | — | — | — |
| | MAA (g) | | — | — | — |
| | PMI (g) | | — | — | — |
| Cross-linking agent | EDMA | | 1.5 | 1.5 | 1.5 |
| | TMP | | — | — | — |
| | 4EG-A | | — | — | — |
| Blowing agent | Isobutane | | — | — | — |
| | Isopentane | | 75 | 75 | 75 |
| Initiator | AIBN (g) | | 1 | 1 | 1 |
| | S(BP) (g) | | — | — | — |
| | OPP (g) | | — | — | — |
| | IPP (g) | | — | — | — |
| Mixer rotating speed (rpm) | | | 5000 | 5000 | 5000 |
| Polymerization temp. (deg. C.) | | | 70 | 70 | 70 |
| Average particle size (μm) | | | — | — | 33 |
| Retention (wt %) | | | — | — | 17.1 |
| Efficiency of retention (%) | | | — | — | 86 |
| Maximum expanding ratio (times) | | | — | — | 47 |
| Repeated compression durability (%) | | | — | — | 65 |
| Stability of suspension in polymerization | | | poor | poor | good |
| Polymerized product sticking on wall inside a reactor | | | found | found | none |
| State of reaction mixture after polymerization | | | *2 | *2 | *1 |

TABLE 3

| | | | Ex. A7 | Ex. A8 | Ex. A9 | Ex. A10 | Ex. A11 | Ex. A12 |
|---|---|---|---|---|---|---|---|---|
| Aqueous dispersing medium | Water soluble compound | Variant 1-% aq. soln. (g) | EDTA 0.5 | 2-carboxy pyridine 0.9 | EDTMP 0.9 | Tannin 0.1 | Vitamin B$_6$ hydrochloride 0.9 | EDTA 0.1 |
| | Deionized water (g) | | 600 | 600 | 600 | 600 | 600 | 600 |
| | NaCl (g) | | 100 | 100 | 100 | 100 | 100 | 100 |
| | Colloidal silica (g) | | 80 | 80 | 80 | 80 | 80 | 80 |
| | Polyvinyl pyrolidone (g) | | 0.1 | 0.1 | 0.1 | 0.1 | 0.1 | 0.1 |
| | Adipic acid-diethanol amine condensate | | — | — | — | — | — | — |
| | pH | | 3.0 | 3.0 | 3.0 | 3.0 | 3.0 | 3.0 |
| Monomer component | AN (g) | | 180 | 180 | 180 | 180 | 180 | 180 |
| | MAN (g) | | 105 | 105 | 105 | 105 | 105 | 105 |
| | MMA (g) | | — | — | — | — | — | — |
| | MA (g) | | — | — | — | — | — | — |
| | V Cl$_2$ (g) | | — | — | — | — | — | — |
| | IBX (g) | | — | — | — | — | — | — |
| | MAA (g) | | 15 | 15 | 15 | 15 | 15 | 15 |
| | PMI (g) | | — | — | — | — | — | — |
| Cross-linking agent | EDMA | | 1.5 | 1.5 | 1.5 | 1.5 | 1.5 | 1.5 |
| | TMP | | — | — | — | — | — | — |
| | 4EG-A | | — | — | — | — | — | — |
| Blowing agent | Isobutane | | — | — | — | — | — | — |
| | Isopentane | | 75 | 75 | 75 | 75 | 75 | 75 |
| Initiator | AIBN (g) | | 1 | 1 | 1 | 1 | 1 | 1 |
| | S(BP) (g) | | — | — | — | — | — | — |
| | OPP (g) | | — | — | — | — | — | — |
| | IPP (g) | | — | — | — | — | — | — |
| Mixer rotating speed (rpm) | | | 5000 | 5000 | 5000 | 5000 | 5000 | 5000 |
| Polymerization temp. (deg. C.) | | | 70 | 70 | 70 | 70 | 70 | 70 |
| Average particle size (μm) | | | 33 | 31 | 32 | 29 | 35 | 34 |

TABLE 3-continued

|  | Ex. A7 | Ex. A8 | Ex. A9 | Ex. A10 | Ex. A11 | Ex. A12 |
|---|---|---|---|---|---|---|
| Retention (wt %) | 19.1 | 19.3 | 19.1 | 18.7 | 18.1 | 19.5 |
| Efficiency of retention (%) | 96 | 97 | 96 | 94 | 91 | 98 |
| Maximum expanding ratio (times) | 69 | 74 | 69 | 63 | 57 | 73 |
| Repeated compression durability (%) | 86 | 88 | 86 | 84 | 81 | 87 |
| Stability of suspension in polymerization | good | good | good | good | good | good |
| Polymerized product sticking on wall inside a reactor | none | none | none | none | none | none |
| State of reaction mixture after polymerization | *1 | *1 | *1 | *1 | *1 | *1 |

TABLE 4

|  |  |  | Ex. A13 | Comp. ex. A4 | Ex. A14 | Ex. A15 | Ex. A16 |
|---|---|---|---|---|---|---|---|
| Aqueous dispersing medium | Water soluble compound | Variant | EDTA | Sodium nitrite | EDTA | Gallic acid | EDTA |
|  |  | 1-% aq. soln. (g) | 0.5 | 15.0 | 0.5 | 0.1 | 0.5 |
|  | Deionized water (g) |  | 600 | 600 | 600 | 600 | 600 |
|  | NaCl (g) |  | 100 | 100 | — | — | — |
|  | Colloidal silica (g) |  | 80 | 80 | 80 | 80 | 80 |
|  | Polyvinyl pyrolidone (g) |  | 0.1 | 0.1 | 0.1 | 0.1 | 0.1 |
|  | Adipic acid-diethanol amine condensate |  | — | — | — | — | — |
|  | pH |  | 3.0 | 3.0 | 3.0 | 3.0 | 3.0 |
| Monomer component | AN (g) |  | 100 | 100 | 180 | 180 | 140 |
|  | MAN (g) |  | 20 | 120 | — | — | — |
|  | MMA (g) |  | — | — | 120 | 120 | 20 |
|  | MA (g) |  | — | — | — | — | — |
|  | VCl₂ (g) |  | — | — | — | — | 140 |
|  | IBX (g) |  | — | — | — | — | — |
|  | MAA (g) |  | 180 | 180 | — | — | — |
|  | PMI (g) |  | — | — | — | — | — |
| Cross-linking agent | EDMA |  | 0.5 | 0.5 | 1.5 | 1.5 | 1.5 |
|  | TMP |  | — | — | — | — | — |
|  | 4EG-A |  | — | — | — | — | — |
| Blowing agent | Isobutane |  | — | — | — | — | 75 |
|  | Isopentane |  | 75 | 75 | 75 | 75 | — |
| Initiator | AIBN (g) |  | — | — | 1 | 1 | — |
|  | S(BP) (g) |  | 1 | 1 | — | — | — |
|  | OPP (g) |  | — | — | — | — | — |
|  | IPP (g) |  | — | — | — | — | 1 |
| Mixer rotating speed (rpm) |  |  | 5000 | 5000 | 7000 | 7000 | 8000 |
| Polymerization temp. (deg. C.) |  |  | 50 | 50 | 70 | 70 | 50 |
| Average particle size (μm) |  |  | 24 | 26 | 18 | 17 | 12 |
| Retention (wt %) |  |  | 19.1 | 16.7 | 19.3 | 18.1 | 19.5 |
| Efficiency of retention (%) |  |  | 96 | 84 | 97 | 91 | 98 |
| Maximum expanding ratio (times) |  |  | 70 | 41 | 64 | 53 | 73 |
| Repeated compression durability (%) |  |  | 88 | 45 | 83 | 78 | 86 |
| Stability of suspension in polymerization |  |  | good | poor | good | good | good |
| Polymerized product sticking on wall inside a reactor |  |  | none | found | none | none | none |
| State of reaction mixture after polymerization |  |  | *1 | *2 | *1 | *1 | *1 |

TABLE 5

|  |  |  | Ex. A17 | Ex. A18 | Comp. ex. A4 | Comp. ex. A5 |
|---|---|---|---|---|---|---|
| Aqueous dispersing medium | Water soluble compound | Variant | DTPA | 2-carboxy pyridine | Potassium dichromate | Sodium nitrite |
|  |  | 1-% aq. soln. (g) | 20 | 10 | 7.5 | 15 |
|  | Deionized water (g) |  | 600 | 600 | 600 | 600 |
|  | NaCl (g) |  | 20 | 20 | 20 | 20 |
|  | Colloidal silica (g) |  | 80 | 80 | 80 | 80 |
|  | Polyvinyl pyrolidone (g) |  | — | — | — | — |
|  | Adipic acid-diethanol amine condensate |  | 3 | 3 | 3 | 3 |
|  | pH |  | 3.0 | 3.0 | 3.0 | 3.0 |

TABLE 5-continued

|  |  | Ex. A17 | Ex. A18 | Comp. ex. A4 | Comp. ex. A5 |
|---|---|---|---|---|---|
| Monomer component | AN (g) | 160 | 160 | 160 | 160 |
|  | MAN (g) | — | — | — | — |
|  | MMA (g) | 100 | 100 | 100 | 100 |
|  | MA (g) | 40 | 40 | 40 | 40 |
|  | V Cl$_2$ (g) | — | — | — | — |
|  | IBX (g) | — | — | — | — |
|  | MAA (g) | — | — | — | — |
|  | PMI (g) | — | — | — | — |
| Cross-linking agent | EDMA | 1.0 | 1.0 | 1.0 | 1.0 |
|  | TMP | — | — | — | — |
|  | 4EG-A | — | — | — | — |
| Blowing agent | Isobutane | 80 | 80 | 80 | 80 |
|  | Isopentane | — | — | — | — |
| Initiator | AIBN (g) | — | — | — | — |
|  | S(BP) (g) | — | — | — | — |
|  | OPP (g) | 2 | 2 | 2 | 2 |
|  | IPP (g) | — | — | — | — |
| Mixer rotating speed (rpm) |  | 8000 | 8000 | 8000 | 8000 |
| Polymerization temp. (deg. C.) |  | 55 | 55 | 55 | 55 |
| Average particle size (μm) |  | 15 | 15 | 17 | 17 |
| Retention (wt %) |  | 19.2 | 19.8 | 18.8 | 18.2 |
| Efficiency of retention (%) |  | 92 | 95 | 90 | 87 |
| Maximum expanding ratio (times) |  | 73 | 74 | 45 | 18 |
| Repeated compression durability (%) |  | 85 | 83 | 61 | 43 |
| Stability of suspension in polymerization |  | good | good | good | poor |
| Polymerized product sticking on wall inside a reactor |  | none | none | none | found |
| State of reaction mixture after polymerization |  | *1 | *1 | *1 | *2 |

TABLE 6

|  |  |  | Ex. A19 | Ex. A20 | Comp. ex. A6 | Comp. ex. A7 |
|---|---|---|---|---|---|---|
| Aqueous dispersing medium | Water soluble compound | Variant | DTPA | 2-carboxy pyridine | Potassium dichromate | Sodium nitrite |
|  |  | 1-% aq. soln. (g) | 40 | 12.5 | 7.5 | 20 |
|  | Deionized water (g) |  | 600 | 600 | 600 | 600 |
|  | NaCl (g) |  | 20 | 20 | 20 | 20 |
|  | Colloidal silica (g) |  | 80 | 80 | 80 | 80 |
|  | Polyvinyl pyrolidone (g) |  | — | — | — | — |
|  | Adipic acid-diethanol amine condensate |  | 10 | 10 | 10 | 10 |
|  | pH |  | 3.0 | 3.0 | 3.0 | 3.0 |
| Monomer component | AN (g) |  | 170 | 170 | 170 | 170 |
|  | MAN (g) |  | — | — | — | — |
|  | MMA (g) |  | 130 | 130 | 130 | 130 |
|  | MA (g) |  | — | — | — | — |
|  | V Cl$_2$ (g) |  | — | — | — | — |
|  | IBX (g) |  | — | — | — | — |
|  | MAA (g) |  | — | — | — | — |
|  | PMI (g) |  | — | — | — | — |
| Cross-linking agent | EDMA |  | 1.0 | 1.0 | 1.0 | 1.0 |
|  | TMP |  | — | — | — | — |
|  | 4EG-A |  | — | — | — | — |
| Blowing agent | Isobutane |  | 40 | 40 | 40 | 40 |
|  | Isopentane |  | 95 | 95 | 95 | 95 |
| Initiator | AIBN (g) |  | — | — | — | — |
|  | S(BP) (g) |  | — | — | — | — |
|  | OPP (g) |  | 2 | 2 | 2 | 2 |
|  | IPP (g) |  | — | — | — | — |
| Mixer rotating speed (rpm) |  |  | 8000 | 8000 | 8000 | 8000 |
| Polymerization temp. (deg. C.) |  |  | 55 | 55 | 55 | 55 |
| Average particle size (μm) |  |  | 11 | 12 | 9 | 9 |
| Retention (wt %) |  |  | 24.8 | 25.5 | 23.8 | 22.9 |
| Efficiency of retention (%) |  |  | 90 | 93 | 86 | 83 |
| Maximum expanding ratio (times) |  |  | 79 | 80 | 44 | 13 |
| Repeated compression durability (%) |  |  | 86 | 84 | 58 | 44 |
| Stability of suspension in polymerization |  |  | good | good | good | poor |
| Polymerized product sticking on wall inside a reactor |  |  | none | none | none | found |
| State of reaction mixture after polymerization |  |  | *1 | *1 | *1 | *2 |

TABLE 7

|  |  |  | Ex. A21 | Ex. A22 | Comp. ex. A8 | Comp. ex. A9 |
|---|---|---|---|---|---|---|
| Aqueous dispersing medium | Water soluble compound | Variant | DTPA | 2-carboxy pyridine | Potassium dichromate | Sodium nitrite |
|  |  | 1-% aq. soln. (g) | 40 | 12.5 | 7.5 | 20 |
|  | Deionized water (g) |  | 600 | 600 | 600 | 600 |
|  | NaCl (g) |  | 20 | 20 | 20 | 20 |
|  | Colloidal silica (g) |  | 75 | 75 | 75 | 75 |
|  | Polyvinyl pyrolidone (g) |  | — | — | — | — |
|  | Adipic acid-diethanol amine condensate |  | 10 | 10 | 10 | 10 |
|  | pH |  | 3.0 | 3.0 | 3.0 | 3.0 |
| Monomer component | AN (g) |  | 180 | 180 | 180 | 180 |
|  | MAN (g) |  | 105 | 105 | 105 | 105 |
|  | MMA (g) |  | — | — | — | — |
|  | MA (g) |  | — | — | — | — |
|  | V $Cl_2$ (g) |  | — | — | — | — |
|  | IBX (g) |  | 15 | 15 | 15 | 15 |
|  | MAA (g) |  | — | — | — | — |
|  | PMI (g) |  | — | — | — | — |
| Cross-linking agent | EDMA |  | — | — | — | — |
|  | TMP |  | 0.5 | 0.5 | 0.5 | 0.5 |
|  | 4EG-A |  | 0.5 | 0.5 | 0.5 | 0.5 |
| Blowing agent | Isobutane |  | 35 | 35 | 35 | 35 |
|  | Isopentane |  | 25 | 25 | 25 | 25 |
| Initiator | AIBN (g) |  | — | — | — | — |
|  | S(BP) (g) |  | — | — | — | — |
|  | OPP (g) |  | 3.0 | 3.0 | 3.0 | 3.0 |
|  | IPP (g) |  | — | — | — | — |
| Mixer rotating speed (rpm) |  |  | 8000 | 8000 | 8000 | 8000 |
| Polymerization temp. (deg. C.) |  |  | 55 | 55 | 55 | 55 |
| Average particle size (μm) |  |  | 15 | 14 | 14 | 14 |
| Retention (wt %) |  |  | 15.1 | 15.3 | 14.9 | 14.0 |
| Efficiency of retention (%) |  |  | 92 | 93 | 90 | 85 |
| Maximum expanding ratio (times) |  |  | 65 | 63 | 45 | 22 |
| Repeated compression durability (%) |  |  | 84 | 86 | 70 | 58 |
| Stability of suspension in polymerization |  |  | good | good | good | poor |
| Polymerized product sticking on wall inside a reactor |  |  | none | none | none | found |
| State of reaction mixture after polymerization |  |  | *1 | *1 | *1 | *2 |

TABLE 8

|  |  |  | Ex. B1 | Ex. B2 | Ex. B3 | Ex. B4 | Ex. B5 | Ex. B6 |
|---|---|---|---|---|---|---|---|---|
| Aqueous dispersing medium | Water soluble compound | Variant | $AlCl_3 \cdot 6H_2O$ | $FeCl_3$ | $TiCl_3$ | $SbCl_3$ | $AlCl_3 \cdot 6H_2O$ | $AlCl_3 \cdot 6H_2O$ |
|  |  | 1-% aq. soln. (g) | 0.5 | 0.9 | 0.9 | 0.1 | 0.9 | 0.1 |
|  | Metal ion |  | $Al^{3+}$ | $Fe^{3+}$ | $Ti^{3+}$ | $Sb^{5+}$ | $Al^{3+}$ | $Al^{3+}$ |
|  | Metal ion conc. (ppm) |  | 1.7 | 2.9 | 2.5 | 5.0 | 3.4 | 1.7 |
|  | Halide ion |  | $Cl^-$ | $Cl^-$ | $Cl^-$ | $Cl^-$ | $Cl^-$ | $Cl^-$ |
|  | Halide ion conc. (ppm) |  | $1.0 \times 10^5$ | $1.0 \times 10^5$ | $1.0 \times 10^5$ | $1.0 \times 10^5$ | $1.0 \times 10^5$ | $1.0 \times 10^5$ |
|  | Deionized water (g) |  | 600 | 600 | 600 | 600 | 600 | 600 |
|  | NaCl (g) |  | 100 | 100 | 100 | 100 | 100 | 100 |
|  | Colloidal silica (g) |  | 80 | 80 | 80 | 80 | 80 | 80 |
|  | Polyvinyl pyrolidone (g) |  | 0.1 | 0.1 | 0.1 | 0.1 | 0.1 | 0.1 |
|  | Adipic acid-diethanol amine condensate |  | — | — | — | — | — | — |
|  | pH |  | 3.0 | 3.0 | 3.0 | 3.0 | 3.0 | 3.0 |
| Monomer component | AN (g) |  | 180 | 180 | 180 | 180 | 180 | 100 |
|  | MAN (g) |  | 105 | 105 | 105 | 105 | 105 | 20 |
|  | MMA (g) |  | 15 | 15 | 15 | 15 | 15 | — |
|  | MA (g) |  | — | — | — | — | — | — |
|  | V $Cl_2$ (g) |  | — | — | — | — | — | — |
|  | IBX (g) |  | — | — | — | — | — | — |
|  | MAA (g) |  | — | — | — | — | — | 180 |
|  | PMI (g) |  | — | — | — | — | — | — |
| Cross-linking agent | EDMA |  | 1.5 | 1.5 | 1.5 | 1.5 | 1.5 | 1.5 |
|  | TMP |  | — | — | — | — | — | — |
|  | 4EG-A |  | — | — | — | — | — | — |
| Blowing agent | Isobutane |  | — | — | — | — | — | — |
|  | Isopentane |  | 75 | 75 | 75 | 75 | 75 | 75 |
| Initiator | AIBN (g) |  | 1 | 1 | 1 | 1 | 1 | — |
|  | S(BP) (g) |  | — | — | — | — | — | 1 |
|  | OPP (g) |  | — | — | — | — | — | — |
|  | IPP (g) |  | — | — | — | — | — | — |

TABLE 8-continued

|  | Ex. B1 | Ex. B2 | Ex. B3 | Ex. B4 | Ex. B5 | Ex. B6 |
| --- | --- | --- | --- | --- | --- | --- |
| Mixer rotating speed (rpm) | 5000 | 5000 | 5000 | 5000 | 5000 | 5000 |
| Polymerization temp. (deg. C.) | 70 | 70 | 70 | 70 | 70 | 70 |
| Average particle size (μm) | 34 | 33 | 33 | 35 | 33 | 33 |
| Retention (wt %) | 19.1 | 19.1 | 19.3 | 19.3 | 19.3 | 19.1 |
| Efficiency of retention (%) | 96 | 96 | 97 | 97 | 97 | 96 |
| Maximum expanding ratio (times) | 70 | 69 | 72 | 74 | 75 | 70 |
| Repeated compression durability (%) | 85 | 83 | 87 | 89 | 90 | 85 |
| Stability of suspension in polymerization | good | good | good | good | good | good |
| Polymerized product sticking on wall inside a reactor | none | none | none | none | none | none |
| State of reaction mixture after polymerization | *1 | *1 | *1 | *1 | *1 | *1 |

TABLE 9

|  |  |  | Ex. B7 | Ex. B8 | Ex. B9 | Comp. ex. B1 | Comp. ex. B2 | Comp. ex. B3 | Comp. ex. B4 |
| --- | --- | --- | --- | --- | --- | --- | --- | --- | --- |
| Aqueous dispersing medium | Water soluble compound | Variant | AlCl$_3$•6H$_2$O | AlCl$_3$•6H$_2$O | AlCl$_3$•6H$_2$O | none | Sodium ascorbate | Sodium ascorbate | Sodium nitrite |
|  |  | 1-% aq. soln. (g) | 0.5 | 0.5 | 0.5 | — | 0.5 | 3.0 | 15 |
|  | Metal ion |  | Al$^{3+}$ | Al$^{3+}$ | Al$^{3+}$ | — | — | — | — |
|  | Metal ion conc. (ppm) |  | 1.7 | 1.7 | 1.7 | — | — | — | — |
|  | Halide ion |  | Cl$^-$ | Cl$^-$ | Cl$^-$ | Cl$^-$ | Cl$^-$ | Cl$^-$ | Cl$^-$ |
|  | Halide ion conc. (ppm) |  | 1.0 × 10$^5$ | 1.0 × 10$^5$ | 1.0 × 10$^5$ | 1.0 × 10$^5$ | 1.0 × 10$^5$ | 1.0 × 10$^5$ | 1.0 × 10$^5$ |
|  | Deionized water (g) |  | 600 | 600 | 600 | 600 | 600 | 600 | 600 |
|  | NaCl (g) |  | 100 | 100 | 100 | 100 | 100 | 100 | 100 |
|  | Colloidal silica (g) |  | 80 | 80 | 50 | 80 | 80 | 80 | 80 |
|  | Polyvinyl pyrolidone (g) |  | 0.1 | 0.1 | — | 0.1 | 0.1 | 0.1 | 0.1 |
|  | Adipic acid-diethanol amine condensate |  | — | — | 10 | — | — | — | — |
|  | pH |  | 3.0 | 3.0 | 3.0 | 3.0 | 3.0 | 3.0 | 3.0 |
| Monomer component | AN (g) |  | 180 | 180 | 180 | 180 | 180 | 180 | 180 |
|  | MAN (g) |  | 120 | 105 | 85 | 105 | 105 | 105 | 105 |
|  | MMA (g) |  | — | 15 | — | 15 | 15 | — | 15 |
|  | MA (g) |  | — | — | — | — | — | — | — |
|  | VCl$_2$ (g) |  | — | — | — | — | — | — | — |
|  | MAA (g) |  | — | — | — | — | — | 15 | — |
|  | PMI (g) |  | — | — | 20 | — | — | — | — |
| Cross-linking agent | EDMA |  | 1.5 | 1.5 | — | 1.5 | 1.5 | 1.5 | 1.5 |
|  | TMP |  | — | — | 1.0 | — | — | — | — |
|  | 4EG-A |  | — | — | — | — | — | — | — |
| Blowing agent | Isobutane |  | — | — | — | — | — | — | — |
|  | Isopentane |  | 75 | 75 | 75 | 75 | 75 | 75 | 75 |
| Initiator | AIBN (g) |  | 1 | 1 | — | 1 | 1 | 1 | 1 |
|  | S(BP) (g) |  | — | — | — | — | — | — | — |
|  | OPP (g) |  | — | — | 2 | — | — | — | — |
|  | IPP (g) |  | — | — | — | — | — | — | — |
| Mixer rotating speed (rpm) |  |  | 6000 | 7000 | 6000 | 5000 | 5000 | 5000 | 5000 |
| Polymerization temp. (deg. C.) |  |  | 50 | 70 | 55 | 70 | 70 | 70 | 70 |
| Average particle size (μm) |  |  | 24 | 18 | 24 | 13 | — | — | 33 |
| Retention (wt %) |  |  | 19.1 | 19.3 | 19.2 | — | — | — | 17.1 |
| Efficiency of retention (%) |  |  | 98 | 97 | 96 | — | — | — | 86 |
| Maximum expanding ratio (times) |  |  | 73 | 64 | 81 | — | — | — | 47 |
| Repeated compression durability (%) |  |  | 86 | 83 | 87 | — | — | — | 65 |
| Stability of suspension in polymerization |  |  | good | good | good | poor | poor | poor | good |
| Polymerized product sticking on wall inside a reactor |  |  | none | none | none | found | found | found | none |
| State of reaction mixture after polymerization |  |  | *1 | *1 | *1 | *1 | *2 | *2 | *1 |

TABLE 10

|  |  |  | Ex. C1 | Ex. C2 | Ex. C3 | Ex. C4 | Ex. C5 |
| --- | --- | --- | --- | --- | --- | --- | --- |
| Aqueous dispersing medium | Water soluble compound | Variant | DTPA/ 2-carboxy pyridine | DTPA/ 2-carboxy pyridine | DTPA/ 2-carboxy pyridine | DTPA/ 2-carboxy pyridine | EDTA/ AlCl$_3$•6H$_2$O |
|  |  | 1-% aq. soln. (g) | 20/10 | 20/10 | 20/10 | 20/10 | 0.5/0.5 |

TABLE 10-continued

|  |  | Ex. C1 | Ex. C2 | Ex. C3 | Ex. C4 | Ex. C5 |
|---|---|---|---|---|---|---|
|  | Deionized water (g) | 600 | 600 | 600 | 600 | 600 |
|  | NaCl (g) | 20 | 20 | 50 | 20 | 100 |
|  | Colloidal silica (g) | 80 | 80 | 50 | 75 | 80 |
|  | Polyvinyl pirroridone (g) | — | — | — | — | 0.1 |
|  | Adipic acid-diethanol amine condensate | 3 | 10 | 10 | 10 | — |
|  | pH | 3.0 | 3.0 | 3.0 | 3.0 | 3.0 |
| Monomer component | AN (g) | 160 | 170 | 180 | 180 | 180 |
|  | MAN (g) | — | — | 85 | 105 | 105 |
|  | MMA (g) | 100 | 130 | — | — | — |
|  | MA (g) | 40 | — | — | — | — |
|  | VCl$_2$ (g) | — | — | — | — | — |
|  | IBX (g) | — | — | 15 | 15 | 15 |
|  | MAA (g) | — | — | — | — | — |
|  | PMI (g) | — | — | 20 | — | — |
| Cross-linking agent | EDMA | 1.0 | 1.0 | — | — | 0.5 |
|  | TMP | — | — | 1.0 | 0.5 | 0.5 |
|  | 4EG-A | — | — | — | 0.5 | — |
| Blowing agent | Isobutane | 80 | 40 | — | 35 | — |
|  | Isopentane | — | 95 | 95 | 25 | 75 |
| Initiator | AIBN (g) | — | — | — | — | — |
|  | S(BP) (g) | — | — | — | — | — |
|  | OPP (g) | 2 | 2 | 2 | 3.0 | 3.0 |
|  | IPP (g) | — | — | — | — | — |
| Mixer rotating speed (rpm) |  | 8000 | 8000 | 6000 | 8000 | 6000 |
| Polymerization temp. (deg. C.) |  | 55 | 55 | 55 | 55 | 55 |
| Average particle size (μm) |  | 16 | 11 | 25 | 14 | 24 |
| Retention (wt %) |  | 19.5 | 25.8 | 21.8 | 15.4 | 18.0 |
| Efficiency of retention (%) |  | 93 | 94 | 91 | 93 | 91 |
| Maximum expanding ratio (times) |  | 83 | 82. | 81 | 70 | 76 |
| Repeated compression durability (%) |  | 89 | 88 | 87 | 85 | 89 |
| Stability of suspension in polymerization |  | good | good | good | good | good |
| Polymerized product sticking on wall inside a reactor |  | none | none | none | none | none |
| State of reaction mixture after polymerization |  | *1 | *1 | *1 | *1 | *1 |

In the tables described above, the symbols and abbreviations are used with the meaning as follows.

*1: Reaction mixture after polymerization was in good state without abnormal property.

*2: Most of reaction mixture after polymerization aggregated and/or solidified.

EDTA: ethylenediaminetetraacetic acid tetrasodium salt tetrahydrate (supplied by Chelest, with the trade name of CHELEST 3D)

GLDA: dicarboxymethyl glutamic acid tetrasodium salt (supplied by Chelest, with the trade name of CHELEST CMG-40)

PBTC: phosphonobutanetriacetic acid trisodium salt (supplied by Chelest, with the trade name of CHELEST PH-430)

EDTMP: ethylene diamine tetra(methylene phosphonic acid) (supplied by Chelest, with the trade name of CHELEST PH-540)

Tannin: tannic acid (supplied by Wako Pure Chemical Industries, Ltd.)

Vitamin B$_6$ hydrochloride: pyridoxine hydrochloride (supplied by Wako Pure Chemical Industries, Ltd.)

Gallic acid:gallic acid hydrate (supplied by Wako Pure Chemical Industries, Ltd.)

Potassium dichromate: potassium dichromate (supplied by Wako Pure Chemical Industries, Ltd.)

DTPA: diethylenetriaminepentaacetic acid pentasodium salt (supplied by Nagase Chemtex, with the trade name of CLEWAT DP-80)

Thiodiglycolic acid: supplied by Wako Pure Chemical Industries, Ltd.

2-hydroxy pyridine: supplied by Wako Pure Chemical Industries, Ltd.

2-carboxy pyridine: supplied by Wako Pure Chemical Industries, Ltd., with the trade name of 2-pyridinecarboxylic acid Vitamin B$_2$: riboflavin (supplied by Wako Pure Chemical Industries, Ltd., with the trade name of Vitamin B2)

Adipic acid-diethanol amine condensate: 50-% aqueous solution

AN: acrylonitrile

MAN: methacrylonitrile

MMA: methyl methacrylate

MA: methyl acrylate

VCl$_2$: vinylidene chloride

IBX: isobornyl methacrylate

MAA: methacrylic acid

PMI: N-phenyl maleimide (supplied by Nippon Shokubai Co., Ltd.)

EDMA: diethyleneglycol dimethacrylate (supplied by Mitsubishi Rayon Co., Ltd.)

TMP: trimethylolpropane trimethacrylate (supplied by Kyoeisha Chemical Co., Ltd.)

4EG-A: PEG(200) dimethacrylate (supplied by Kyoeisha Chemical Co., Ltd.)

AIBN: 2,2'-azo isobutyronitrile (supplied by Japan Hydrazine Company, Inc.)

S(BP): di(sec-butylperoxy) dicarbonate (Lupasol 225 or S(BP), 50% concentration, supplied by Arkema Yoshitomi, Ltd.)

OPP: di(2-ethylhexylperoxy) dicarbonate (PEROYL OPP, 70% concentration, supplied by NOF Corporation)

IPP: diisopropylperoxy dicarbonate (PEROYL IPP, 50% concentration, supplied by NOF Corporation)

Example D1

Three weight percent of the heat-expandable microspheres obtained in Example A13 and 97 weight percent of polypropylene (having a density of 0.9 g/cm3, and a melt flow rate of 14 g/10 min at 230 deg.C.) were placed in a Super Mixer (manufactured by Kawata MFG Co., Ltd.), and mixed about 1 minute at an agitation speed (about 360 rpm) at which the temperature in the mixer does not increase to 60 deg. C. or higher temperature. The resultant mixture was injection-molded with an injection molding machine having a mold locking force about 80 tons and a screw of 32-mm diameter at an injection pressure about 1000 kg/cm$^2$ to be molded into a disc-shaped molded product, 3 mm thick and 98 mm in diameter. The injection-molding was carried out at the temperature levels of 190 deg.C., 210 deg.C., 230 deg.C., and 250 deg.C., and the density and the lightened ratio of the resultant molded products were determined and calculated. The result is shown in Table 11.

Comparative Example D1

A molded product was produced in the same manner as in Example D1, except that the heat-expandable microspheres obtained in Example A13 was replaced with the heat-expandable microspheres obtained in Comparative example A4. The result is shown in Table 11.

Example D2

(Production Method of Master Batch Containing 30 Weight Percent of Heat-Expandable Microspheres)

Thirty weight percent of the heat-expandable microspheres obtained in Example A13, 70 weight percent of polyethylene (ENGAGE SM8400, having a density of 0.9 g/cm$^3$ and a melting point of 63.3 deg.C. determined with DSC, produced by Dow Chemical Japan), and 2 weight percent of paraffin oil (150s) were placed in a Super Mixer (manufactured by Kawata MFG Co., Ltd.), and mixed about 1 minute at an agitation speed (about 360 rpm) at which the temperature in the mixer does not increase to 60 deg. C. or higher temperature.

The resultant mixture was poured in a Double-screw extruder (GT-110, manufactured by Ikegai), kneaded at a screw rotational speed of 30 rpm and a die temperature of 90 deg.C., and extruded into 3 to 3.5 mm diameter. The mixture extruded from the die was immediately hot cut with a pivoting hammer fixed at the outlet of the die. The hot cut pellets were immediately transferred into a pellet cooler equipped with a hexagonal rotor, and rotated to be cooled down to 50 deg.C. or lower temperature. Thus the master batch pellets, which contain 30 weight percent of the heat-expandable microspheres obtained in Example A13, and each of which has a diameter of 3 to 3.5 mm and is 2 to 4 mm long, were produced.

(Manufacturing Molded Products)

In Example D2, the molded products were produced in the same manner as in Example D1 except that the mixture of 10 weight percent of the above-mentioned master batch pellets and 90 weight percent of polypropylene was used as the raw material instead of the mixture of 3 weight percent of the heat-expandable microspheres of Example D1 and 97 weight percent of polypropylene. The density and the lightened ratio of the resultant molded products were determined and calculated. The result is shown in Table 11.

Comparative Example D2

In Comparative example D2, the molded products were produced in the same manner as in Example D2 except that the heat-expandable microspheres obtained in Example A13 was replaced with the heat-expandable microspheres obtained in Comparative example A4. The density and the lightened ratio of the resultant molded products were determined and calculated. The result is shown in Table 11.

TABLE 11

|  | Extrusion temperature (deg. C.) | Density (g/cm$^3$) | Lightened ratio (%) |
| --- | --- | --- | --- |
| Example D1 | 190 | 0.68 | 24 |
|  | 210 | 0.64 | 29 |
|  | 230 | 0.63 | 30 |
|  | 250 | 0.61 | 32 |
| Comp. example D1 | 190 | 0.83 | 8 |
|  | 210 | 0.84 | 7 |
|  | 230 | 0.83 | 8 |
|  | 250 | 0.85 | 6 |
| Example D2 | 190 | 0.67 | 26 |
|  | 210 | 0.63 | 30 |
|  | 230 | 0.62 | 31 |
|  | 250 | 0.60 | 33 |
| Comp. example D2 | 190 | 0.88 | 2 |
|  | 210 | 0.89 | 1 |
|  | 230 | 0.87 | 3 |
|  | 250 | 0.88 | 2 |

The result in Table 11 clearly shows that the heat-expandable microspheres of the present invention exhibit excellent lightening performance when they are employed for lightening resin, and high durability against mixing stress in making master batches.

Example D3

(Production Method of Hollow Particulates)

An aqueous dispersion (slurry) containing 5 weight percent of the heat-expandable microspheres produced in Example A21 was prepared. The microspheres in the aqueous dispersion was expanded in the wet heating and expanding method described in JP A 62-201231 to produce hollow particulates. The detail is described as follows.

The slurry was fed through a slurry introducing pipe to an expanding pipe (specified as SUS304TP in JIS, 16 mm in diameter with 120 ml capacity) at a flow rate of 5 liter/min. Then steam (temperature 147 deg.C., pressure 0.3 MPa) was fed through a steam introducing pipe to mix with the slurry and to heat and expand the microspheres under wet condition. The temperature of the slurry after mixing with the steam was controlled at 120 deg.C. and the pressure of the mixture was 0.18 MPa.

The resultant slurry containing hollow particulates was flowed out through the tip of the expanding pipe and mixed with cooling water (at 15 deg.C.) to be cooled down to 50 to 60 deg.C. The cooled slurry was dehydrated with a centrifugal dehydrator to obtain composition (containing 15 weight percent of water) containing wet hollow particulates.

Raw materials of ceramic, i.e., 283 g of cordierite, 14.2 g of methyl cellulose, and 42.5 g of the composition obtained above were kneaded into ceramic composition which could be extrusion-molded. Then the ceramic composition was formed with extrusion-molding, and shaped into unbaked ceramic-molded articles (clay articles).

Then the density of the clay constituting the ceramic-molded articles (clay articles) was determined in the following procedure to evaluate the durability of the hollow particulates against rupture caused by the stress generated in mixing the hollow particulates and ceramic material and in extrusion-molding the composition comprising the hollow particulates and ceramic material. The result is shown in Table 12.

(Measurement of Clay Density)

A ceramic-molded article (clay article) was cut into a certain volume, and weighed. Then the determined weight was divided by the volume to calculate the density of the clay. The result was classified according to the following criteria to evaluate the durability of the hollow particulates in the clay against rupture caused by the stress generated in mixing and extrusion molding. Lower clay density indicates better durability of hollow particulates against rupture caused by the stress generated in mixing and extrusion molding.

(Criteria)

⊚: clay density below 1.4 g/cm$^3$

○: clay density ranging from 1.4 g/cm$^3$ to 1.6 g/cm$^3$ (not including 1.6 g/cm$^3$)

Δ: clay density ranging from 1.6 g/cm$^3$ to 1.7 g/cm$^3$ (not including 1.7 g/cm$^3$)

X: clay density of 1.7 g/cm3 or more

Example D4 and Comparative Examples D3 and D4

In Example D4 and Comparative examples D3 and D4, the evaluation was carried out in the same manner as in Example D3 except that the heat-expandable microspheres used in Example D3 was replaced with each of the raw material heat-expandable microspheres shown in Table 12.

TABLE 12

|  | Raw material heat-expandable microspheres | Density of clay (g/cm$^3$) | Evaluation |
|---|---|---|---|
| Example D3 | Example A21 | 1.3 | ⊚ |
| Example D4 | Example A22 | 1.3 | ⊚ |
| Comp. example D3 | Comp. example A8 | 2.0 | X |
| Comp. example D4 | Comp. example A9 | 2.1 | X |

The result in Table 12 clearly shows that the hollow particulates produced from the heat-expandable microspheres of the present invention exhibit excellent performance when they are mixed with inorganic materials, such as ceramic material, and processed.

Example D5

A greater scale reaction was carried out with the same ratios for mixing materials and the same reaction condition as those in Example B1, and 20 kg of dry heat-expandable microspheres were produced. The heat-expandable microspheres had properties equivalent to those of the heat-expandable microspheres produced in Example B1.

Two kilograms of the heat-expandable microspheres produced in the above-mentioned method and 8 kg of heavy calcium carbonate (WHITON SB Red, with the average particle size of 1.8 micrometer, produced by Shiraishi Calcium Kaisha Ltd.) were fed into a SV Mixer (30 liter capacity, manufactured by KOBELCO Eco-Solutions Co., Ltd.), and mixed for 10 minutes. Then the resultant mixture was transferred into a Lödige mixer (manufactured by Matsubo Corporation), heated with a jacket controlled at 190 deg.C. for 10 minutes to raise the temperature of the mixture to 150 deg. C., and then cooled down to obtain a composition containing hollow particulates having an average particle size of 108 micrometer and a true specific gravity of 0.15 g/cc.

The resultant composition was tested to evaluate the repeated-compression durability of the hollow particulates.

The testing procedure was the same as in the determination of [Repeated-compression durability] already mentioned above, except that 2.00 mg of the hollow particulates were replaced with 10.0 mg of the above-mentioned composition. The result is shown in Table 13.

Comparative Example D5

In Comparative example D5, the determination was performed in the same manner as in Example D5 except that heat-expandable microspheres were produced with the ratios for mixing materials in Comparative example B4 instead of the ratios for mixing materials in Example B1. The result is shown in Table 13.

TABLE 13

|  | Raw material heat-expandable microspheres | True specific gravity (g/cm$^3$) | Repeated-compression durability |
|---|---|---|---|
| Example D5 | Example B1 | 0.15 | 83% |
| Comp. example D5 | Comp. example B4 | 0.16 | 57% |

The result in Table 13 clearly shows that the composition produced from the heat-expandable microspheres of the present invention exhibits excellent performance in the testing of repeated-compression durability.

Example D6

(Forming Unexpanded Coating Film)

A paint was prepared by adding 10 weight percent of the heat-expandable microspheres produced in Example A17 to a liquid of 55 weight percent concentration of ethylene-vinyl acetate copolymer (EVA, consisting of ethylene and vinyl acetate in the ratio of 30:70 weight percent) so as to blend 9 parts by weight of EVA and 1 part by weight of the heat-expandable microspheres. The paint was spread on double-faced art paper with a coater having 200-micrometer gap. Then the double-faced art paper coated with the paint was dried to form 200-micrometer thick unexpanded coating film containing 10 weight percent of the heat-expandable microspheres produced in Example A17 on the surface of the double-faced art paper.

(Forming Expanded Coating Film)

The double-faced art paper on which the unexpanded coating film was formed was heated in a Geer oven at a certain temperature for a certain period to obtain double-faced art paper on which expanded coating film was formed.

(Determination Method for Expanding Ratio)

The thickness of the double-faced art paper on which unexpanded coating film was formed (A) and the thickness of the double-faced art paper on which expanded coating film was formed (B) were determined, and the ratio between the thicknesses of unexpanded and expanded films (B/A) was calculated to evaluate the design effect. The result is shown in Table 14. Higher ratio of increased thickness indicates better design effect.

Examples D7 and D8 and Comparative examples D6 and D7

In Examples D7 and D8 and Comparative examples D6 and D7, the evaluation was carried out in the same manner as in Example D6, except that the raw material heat-expandable microspheres was replaced with each of the microspheres shown in Table 13.

TABLE 14

|  | Raw material heat-expandable microspheres | Heating temperature (deg. C.) (2 min) | Ratio of increased thickness |
|---|---|---|---|
| Example D6 | Example A17 | 110 | 6.1 |
|  |  | 130 | 7.5 |
|  |  | 150 | 5.8 |
| Example D7 | Example C1 | 110 | 7.3 |
|  |  | 130 | 9.1 |
|  |  | 150 | 7.1 |
| Comp. example D6 | Comp. example A5 | 110 | 1.3 |
|  |  | 130 | 2.6 |
|  |  | 150 | 1.1 |
| Example D8 | Example A19 | 120 | 4.3 |
|  |  | 140 | 8.1 |
|  |  | 160 | 4.2 |
| Comp. example D7 | Comp. example A7 | 120 | 2.3 |
|  |  | 140 | 4.9 |
|  |  | 160 | 2.1 |

The result in Table 14 clearly shows that the expanded coating films formed of the heat-expandable microspheres of the present invention are thick enough and exhibit excellent design effect.

Example D9

(Forming Unexpanded PVC Coating Film)

A compound was prepared by adding 25 parts by weight of polyvinyl chloride (PVC, supplied by Shin Dai-Ichi Enbi Co., Ltd.), 50 parts by weight of DINP (supplied by New Japan Chemical Co., Ltd.), and 25 parts by weight of calcium carbonate (supplied by Bihoku Funka Kogyo Co., Ltd.) to 1 parts by weight of the heat-expandable microspheres produced in Example A17. The resultant compound was spread into 1.5-mm thick film on a 0.8-mm thick Teflon sheet (EGF-500-10) placed on an iron plate for electrodeposition coating. Then the film was heated to be gelled in a Geer oven at 100 deg.C. for 10 minutes, and the resultant film was peeled off the Teflon sheet. Thus unexpanded PVC coating film was formed.

(Forming Expanded Pvc Coating Film)

The unexpanded PVC coating film mentioned above was heated in a Geer oven at a certain temperature for a certain period to obtain expanded PVC coating film.

(Determination Method for Expanding Ratio)

The specific gravity of the unexpanded PVC coating film (A) and that of expanded PVC coating film (B) were determined, and the ratio of decreased specific gravity after expansion (=(A−B)*100/A) was calculated to evaluate the lightening performance. The result is shown in Table 15. Higher ratio of decreased specific gravity represents better lightening performance, cushioning performance, elasticity, and impact resistance.

Examples D10 and D11 and Comparative Examples D8 and D9

In Examples D10 and D11 and Comparative examples D8 and D9, the evaluation was carried out in the same manner as in Example D9, except that the raw material heat-expandable microspheres was replaced with each of the microspheres shown in Table 15.

TABLE 15

|  | Raw material heat-expandable microspheres | Heating temperature (deg. C.) (30 min) | Ratio of decreased specific gravity (%) |
|---|---|---|---|
| Example D9 | Example A17 | 110 | 36 |
|  |  | 130 | 45 |
|  |  | 150 | 31 |
| Example D10 | Example C1 | 110 | 47 |
|  |  | 130 | 60 |
|  |  | 150 | 43 |
| Comp. example D8 | Comp. example A5 | 110 | 3 |
|  |  | 130 | 15 |
|  |  | 150 | 2 |
| Example D11 | Example A19 | 120 | 30 |
|  |  | 140 | 52 |
|  |  | 160 | 27 |
| Comp. example D9 | Comp. example A7 | 120 | 12 |
|  |  | 140 | 21 |
|  |  | 160 | 10 |

The result in Table 15 clearly shows that the expanded PVC coating films formed of the heat-expandable microspheres of the present invention have excellent lightening performance, cushioning performance, elasticity, and impact resistance.

Example D12

(Forming Unexpanded Acrylate Coating Film)

A compound was prepared by adding 50 parts by weight of methacrylate resin powder (supplied by Zeon Corporation), 40 parts by weight of acetyltributyl citrate, and 10 parts by weight of calcium carbonate (supplied by Bihoku Funka Kogyo Co., Ltd.) to 1 parts by weight of the heat-expandable microspheres produced in Example A17. The resultant compound was spread into 1.5-mm thick film on a 0.8-mm thick Teflon sheet (EGF-500-10) placed on an iron plate for electrodeposition coating. Then the film was heated to be gelled in a Geer oven at 100 deg.C. for 10 minutes, and the resultant film was peeled off the Teflon sheet. Thus unexpanded acrylate coating film was formed.

(Forming Expanded Acrylate Coating Film)

The unexpanded acrylate coating film mentioned above was heated in a Geer oven at a certain temperature for a certain period to obtain expanded acrylate coating film.

(Determination of Expanding Ratio)

The specific gravity of the unexpanded acrylate coating film (A) and that of expanded acrylate coating film (B) were determined, and calculated into the ratio of decreased specific gravity after expansion (=(A−B)*100/A) to evaluate lightening performance. The result is shown in Table 16. Higher ratio of decreased specific gravity represents better lightening performance, cushioning performance, elasticity, and impact resistance.

Examples D13 and D14 and Comparative Examples D10 and D1

In Examples D13 and D14 and Comparative examples D10 and D11, the evaluation was carried out in the same manner as in Example D12, except that the raw material heat-expandable microspheres was replaced with each of the microspheres shown in Table 16.

TABLE 16

| Raw material heat-expandable microspheres | | Heating temperature (deg. C.) (30 min) | Ratio of decreased specific gravity (%) |
|---|---|---|---|
| Example D12 | Example A17 | 110 | 40 |
| | | 130 | 55 |
| | | 150 | 39 |
| Example D14 | Example C1 | 110 | 52 |
| | | 130 | 70 |
| | | 150 | 49 |
| Comp. example D10 | Comp. example A5 | 110 | 3 |
| | | 130 | 13 |
| | | 150 | 3 |
| Example D13 | Example A19 | 120 | 38 |
| | | 140 | 64 |
| | | 160 | 33 |
| Comp. example D11 | Comp. example A7 | 120 | 9 |
| | | 140 | 28 |
| | | 160 | 11 |

The result in Table 16 clearly shows that the expanded acrylate coating films formed of the heat-expandable microspheres of the present invention have excellent lightening performance, cushioning performance, elasticity, and impact resistance.

INDUSTRIAL APPLICABILITY

The heat-expandable microspheres of the present invention have high expanding ratio and are thermally expanded into hollow particulates having excellent durability against repeated compression. Thus the heat-expandable microspheres are useful for the application where improved design effect, porosity, lightening effect, sound absorbency, thermal insulation performance, thermal conductivity, and shock absorption performance are intended to be attained.

The production method for the heat-expandable microspheres of the present invention is able to produce the heat-expandable microspheres efficiently.

What is claimed:

1. A method of producing heat-expandable microspheres, each comprising a shell of thermoplastic resin and a blowing agent encapsulated therein having a boiling point not higher than the softening point of the thermoplastic resin, the method comprising the steps of:

dispersing an oily mixture, which contains a polymerizable component and the blowing agent, in an aqueous dispersing medium, which contains at least one water-soluble compound that is free from ascorbic acids; and polymerizing the polymerizable component contained in the oily mixture;

wherein the water-soluble compound is selected from the group consisting of a water-soluble metal salt and/or its hydrate constituted with at least one metal selected from scandium, cerium, hafnium, vanadium, tantalum, molybdenum, tungsten, manganese, rhenium, ruthenium, osmium, cobalt, rhodium, nickel, silver, gold, zinc, cadmium, boron, aluminum, gallium, indium, thallium, lead, arsenic, antimony, and bismuth, a water-soluble polyphenol, a water-soluble vitamin B, and a water-soluble 1,1-substituted compound having a structure in which a hydrophilic functional group selected from the group consisting of a hydroxyl group, carboxylic acid (salt) group, and phosphonic acid (salt) group, and a hetero atom are bonded to the same carbon atom.

2. A method of producing heat-expandable microspheres according to claim 1, wherein the water-soluble compound is a water-soluble 1,1-substituted compound, which contains a carboxylic acid (salt) group and/or phosphonic acid (salt) group as the hydrophilic functional group, and contains a nitrogen atom and/or sulfur atom as the hetero atom.

3. A method of producing heat-expandable microspheres according to claim 1, wherein the water-soluble compound is a water-soluble metal salt and/or its hydrate, and the water-soluble metal salt is a metal (III) halide.

4. A method of producing heat-expandable microspheres according to claim 1, wherein the water-soluble compound is at least one selected from the group consisting of aluminum (III) chloride hexahydrate, antimony (III) chloride, bismuth (III) chloride, tannin, gallic acid, vitamin B2, vitamin B6, ethylenediaminetetraacetic acid (including its salt), hydroxyethylethylenediaminetriacetic acid (including its salt), diethylenetriaminepentaacetic acid (including its salt), dihydroxyethylethylenediaminediacetic acid (including its salt), 1,3-propanediaminetetraacetic acid (including its salt), diethylenetriaminepentaacetic acid (including its salt), triethylenetetraaminehexaacetic acid (including its salt), nitrilotriacetic acid (including its salt), gluconic acid (including its salt), hydroxyethyliminodiacetic acid (including its salt), L-aspartate-N,N-diacetic acid (including its salt), dicarboxymethyl glutamic acid (including its salt), 1,3-diamino-2-hydroxypropanetetraacetic acid (including its salt), dihydroxyethyl glycine (including its salt), aminotrimethylenephosphonic acid (including its salt), hydroxyethanephosphonic acid (including its salt), dihydroxyethyl glycine (including its salt), phosphonobutanetriacetic acid (including its salt), methylenephosphonic acid (including its salt), nitrilotrimethylenephosphonic acid (including its salt), 2-carboxypyridine, orotic acid, quinolinic acid, lutidinic acid, isocinchomeronic acid, dipicolinic acid, berberonic acid, fusaric acid, orotic acid, 2-hydroxypyridine, 6-hydoxynicotine acid, citrazinic acid, and thiodiglycolic acid.

5. A method of producing heat-expandable microspheres according to claim 1, wherein the amount of the water-soluble compound ranges from 0.001 to 1.0 part by weight to 100 parts by weight of the polymerizable component.

* * * * *